US00RE43998E

(19) United States
(12) Reissued Patent
Aoki et al.

(10) Patent Number: US RE43,998 E
(45) Date of Reissued Patent: Feb. 19, 2013

(54) REFRIGERATION/AIR CONDITIONING EQUIPMENT

(75) Inventors: Masanori Aoki, Tokyo (JP); Masato Yosomiya, Tokyo (JP); Fumitake Unezaki, Tokyo (JP); Makoto Saitou, Tokyo (JP); Tetsuji Saikusa, Tokyo (JP)

(73) Assignee: Mitsubishi Electric Corporation, Chiyoda-Ku, Tokyo (JP)

(21) Appl. No.: 12/654,828

(22) Filed: Jan. 5, 2010

Related U.S. Patent Documents

Reissue of:
(64) Patent No.: 7,316,120
Issued: Jan. 8, 2008
Appl. No.: 11/251,788
Filed: Oct. 18, 2005

(30) Foreign Application Priority Data

Oct. 18, 2004 (JP) ..... 2004-303077

(51) Int. Cl.
*F25B 13/00* (2006.01)

(52) U.S. Cl. ..... 62/324.4; 62/504; 62/513

(58) Field of Classification Search ..... 62/513, 62/126, 504, 324.1, 324.4, 160, 225, 237.7, 62/238.7
See application file for complete search history.

(56) References Cited

U.S. PATENT DOCUMENTS

| | | | | |
|---|---|---|---|---|
| 2,893,218 | A | | 7/1959 | Harnish |
| 3,398,785 | A | | 8/1968 | Anderson |
| 3,580,005 | A | | 5/1971 | Hale |
| 4,313,315 | A | | 2/1982 | Calderoni et al. |
| 4,364,714 | A | * | 12/1982 | Zimmern ..... 417/53 |
| 4,411,140 | A | | 10/1983 | Katsummata et al. |
| 4,644,756 | A | | 2/1987 | Sugimoto et al. |
| 4,745,767 | A | | 5/1988 | Ohya et al. |
| 4,760,483 | A | | 7/1988 | Kugelman et al. |
| 4,885,654 | A | | 12/1989 | Budyko et al. |
| 5,095,712 | A | | 3/1992 | Narreau |
| 5,224,354 | A | | 7/1993 | Ito et al. |
| 5,231,845 | A | | 8/1993 | Sumitani et al. |
| 5,370,307 | A | | 12/1994 | Uehra |
| 5,634,352 | A | | 6/1997 | Nagai et al. |

(Continued)

FOREIGN PATENT DOCUMENTS

| | | |
|---|---|---|
| CN | 1379854 | 11/2002 |
| CN | 1468356 | 1/2004 |

(Continued)

OTHER PUBLICATIONS

Office Action dated May 11, 2011, issued in the corresponding Chinese Patent Application No. 200910169183.9, and an English Translation thereof.

(Continued)

*Primary Examiner* — Mohammad Ali
(74) *Attorney, Agent, or Firm* — Buchanan Ingersoll & Rooney PC

(57) ABSTRACT

Refrigeration/air conditioning equipment includes a first internal heat exchanger for exchanging heat between a refrigerant to be sucked in a compressor and a high-pressure liquid refrigerant, an injection circuit for evaporating a bypassed high-pressure liquid at intermediate pressure and injecting the vaporized refrigerant into the compressor, a second internal heat exchanger for exchanging heat between the high-pressure liquid refrigerant and the refrigerant to be injected, and a heat source for heating the refrigerant to be injected.

29 Claims, 11 Drawing Sheets

U.S. PATENT DOCUMENTS

| | | | | |
|---|---|---|---|---|
| 5,678,419 | A | 10/1997 | Sanada et al. | |
| 5,709,090 | A | 1/1998 | Endo et al. | |
| 5,729,985 | A | 3/1998 | Yoshihara et al. | |
| 5,737,931 | A | 4/1998 | Ueno et al. | |
| 5,836,167 | A | 11/1998 | Clouston et al. | |
| 5,865,038 | A | 2/1999 | Maxwell | |
| 5,878,589 | A * | 3/1999 | Tanaka et al. | 62/199 |
| 5,943,879 | A | 8/1999 | Sada et al. | |
| 6,006,532 | A * | 12/1999 | Suzuki et al. | 62/225 |
| 6,044,655 | A | 4/2000 | Ozaki et al. | |
| 6,047,770 | A | 4/2000 | Suzuki et al. | |
| 6,164,086 | A | 12/2000 | Kita et al. | |
| 6,237,351 | B1 | 5/2001 | Itoh et al. | |
| 6,293,123 | B1 * | 9/2001 | Iritani et al. | 62/409 |
| 6,347,528 | B1 * | 2/2002 | Iritani et al. | 62/324.6 |
| 6,467,288 | B2 | 10/2002 | Kuroki et al. | |
| 6,491,090 | B1 * | 12/2002 | Frugier et al. | 165/43 |
| 6,494,055 | B1 | 12/2002 | Meserole et al. | |
| 6,516,626 | B2 | 2/2003 | Escobar et al. | |
| 6,581,397 | B1 | 6/2003 | Taira et al. | |
| 6,718,781 | B2 | 4/2004 | Freund et al. | |
| 6,931,880 | B2 * | 8/2005 | Aflekt et al. | 62/277 |
| 7,024,879 | B2 | 4/2006 | Nakatani et al. | |
| 7,059,151 | B2 * | 6/2006 | Taras et al. | 62/513 |
| 7,137,270 | B2 | 11/2006 | Lifson et al. | |
| 7,424,807 | B2 * | 9/2008 | Sienel | 62/513 |
| 2003/0010046 | A1 | 1/2003 | Freund et al. | |
| 2003/0024267 | A1 | 2/2003 | Zhang | |
| 2004/0025526 | A1 | 2/2004 | Aflekt et al. | |
| 2004/0103681 | A1 * | 6/2004 | Aflekt et al. | 62/278 |
| 2004/0165408 | A1 | 8/2004 | West et al. | |
| 2006/0164102 | A1 | 7/2006 | Kramer et al. | |

FOREIGN PATENT DOCUMENTS

| | | | |
|---|---|---|---|
| DE | 2 252 434 | | 5/1974 |
| EP | 0 299 069 | | 1/1989 |
| EP | 0 306 405 | | 3/1989 |
| EP | 0778451 | A2 | 6/1997 |
| EP | 0 837 291 | A2 | 4/1998 |
| JP | 56-144364 | | 11/1981 |
| JP | 57-118255 | | 7/1982 |
| JP | 64-90961 | | 4/1989 |
| JP | 01-239350 | | 9/1989 |
| JP | 03-105160 | | 5/1991 |
| JP | 03-294750 | | 12/1991 |
| JP | 4-18260 | U | 2/1992 |
| JP | 04-366369 | | 12/1992 |
| JP | 7-108824 | A | 4/1995 |
| JP | 08-121331 | | 5/1996 |
| JP | 08-210709 | A | 8/1996 |
| JP | 09-159287 | | 6/1997 |
| JP | 10-089780 | | 4/1998 |
| JP | 10-115470 | | 5/1998 |
| JP | 10-160269 | | 6/1998 |
| JP | 10-332212 | | 12/1998 |
| JP | 11-30450 | A | 2/1999 |
| JP | 11-248264 | A | 9/1999 |
| JP | 11-248267 | | 9/1999 |
| JP | 11-248294 | | 9/1999 |
| JP | 2000-074504 | | 3/2000 |
| JP | 2000-234811 | A | 8/2000 |
| JP | 2000-249413 | | 9/2000 |
| JP | 2000-274859 | | 10/2000 |
| JP | 2001-27460 | | 1/2001 |
| JP | 2001-174091 | | 6/2001 |
| JP | 2001-263882 | | 9/2001 |
| JP | 2001-296058 | A | 10/2001 |
| JP | 2001-296067 | | 10/2001 |
| JP | 2001-304714 | | 10/2001 |
| JP | 2002-005536 | | 1/2002 |
| JP | 2002-81767 | | 3/2002 |
| JP | 2002-081767 | | 3/2002 |
| JP | 2002-120546 | | 4/2002 |
| JP | 2002-228275 | | 8/2002 |
| JP | 2002-318039 | A | 10/2002 |
| JP | 2003-106693 | A | 4/2003 |
| JP | 2003106693 | A | 4/2003 |
| JP | 2003-185286 | | 7/2003 |
| JP | 2003-194432 | A | 7/2003 |
| JP | 2004-028485 | | 1/2004 |
| JP | 2004-100608 | | 4/2004 |
| JP | 2004-108687 | | 4/2004 |
| JP | 2004-170048 | | 6/2004 |
| JP | 2004-183913 | | 7/2004 |
| JP | 2004-218964 | | 8/2004 |
| JP | 2005-214550 | | 8/2005 |
| JP | 2006-112708 | | 4/2006 |
| JP | 2009-178122 | A | 8/2009 |
| WO | 99/26028 | A1 | 5/1999 |
| WO | WO 02/18848 | | 3/2002 |
| WO | WO 2004/010557 | A2 | 1/2004 |

OTHER PUBLICATIONS

Office Action dated May 11, 2011, issued in the corresponding Chinese Patent Application No. 200910169184.3, and an English Translation thereof.

European Search Report dated Dec. 9, 2010 issued in EP 09 01 1733.

European Search Report dated Dec. 9, 2010 issued in EP 09 01 1734.

European Search Report dated Dec. 9, 2010 issued in EP 09 01 1735.

Notification of Reasons for Refusal dated Dec. 16, 2011 issued by the Chinese Patent Office in corresponding Chinese Patent Application No. 200910169183.9, and an English translation of the main body thereof.

Notification of Reasons for Refusal dated Dec. 31, 2011 issued by the Chinese Patent Office in corresponding Chinese Patent Application No. 200910169184.3, and an English translation of the main body thereof.

Decision of Final Rejection dated Jan. 10, 2012 issued by the Japanese Patent Office in corresponding Japanese Patent Application No. 2009-178280, and an English translation thereof.

Notification of Reasons for Refusal dated Apr. 12, 2011 issued by the Japanese Patent Office in corresponding Japanese Patent Application No. 2009-178280, and an English language translation thereof.

Office Action dated Aug. 17, 2011, issued in the Corresponding Chinese Patent Application No. 200910169182.4, and an English Translation of the main body thereof.

Office Action dated Jul. 7, 2009 issued by the USPTO in corresponding U.S. Appl. No. 11/661,094.

Office Action dated Apr. 15, 2010 issued by the USPTO in corresponding U.S. Appl. No. 11/661,094.

Office Action dated Nov. 3, 2010 issued by the USPTO in corresponding U.S. Appl. No. 11/661,094.

Office Action dated May 31, 2011 issued by the USPTO in corresponding U.S. Appl. No. 11/661,094.

Office Action dated May 25, 2012 issued by the USPTO in corresponding U.S. Appl. No. 11/661,094.

Office Action dated Jan. 27, 2011 issued by the USPTO in corresponding U.S. Appl. No. 12/654,827.

Office Action dated Jun. 6, 2011 issued by the USPTO in corresponding U.S. Appl. No. 12/654,827.

Office Action dated May 26, 2011 issued by the USPTO in corresponding U.S. Appl. No. 12/760,190.

Office Action dated Feb. 3, 2012 issued by the USPTO in corresponding U.S. Appl. No. 12/760,190.

Notification of Rejection from the JPO, Jun. 27, 2006.

Decision of Refusal from the JPO with English translation thereof, Mar. 6, 2007.

Inquiry from the JPO with English translation thereof, Mar. 17, 2009.

Written Reply with English translation thereof, May 13, 2009.

Notification of Rejection from the JPO with English translation thereof, Jun. 30, 2009.

Written Argument and English translation thereof, Jul. 30, 2009.

Notification of Rejection from the JPO with English translation thereof, Jun. 23, 2009.

Written Argument with English translation thereof, Aug. 21, 2009.

Communication Pursuant to Article 94(3) EPC dated Mar. 6, 2008.

Summons to attend oral proceedings pursuant to Rule 115(1) EPC, Jan. 1, 2009.

1996 Ashrae Handbook, "Heating, Ventilating, and Air-Conditioning Systems and Equipment", SI Edition, American Society of Heating, Refrigerating and Air-Conditioning Engineers, Inc., Atlanta, GA, pp. 34.11-34.14 and 34.20.
Notification of Rejection from the JPO, Oct. 27, 2009.
Japanese Release Announcement for "Zubadan-Slim", Mitsubishi Electric Corporation, Apr. 14, 2005, 9 pages, and English-language translation thereof.
Supplementary European Search Report in corresponding Application No. 06714603.5 - 2007 dated Mar. 10, 2009.
Extended European Search Report in corresponding Application No. 05022444.3 - 2301 dated Nov. 27, 2007.
Notification of Reasons for Refusal from the Japanese Patent Office dated Feb. 19, 2010 in Japanese Patent Application No. 2009-178122, and an English-language translation thereof.
Notification of Reasons for Refusal from the Japanese Patent Office dated Feb. 19, 2010 in Japanese Patent Application No. 2009-178206, and an English-language translation thereof.
Japanese language Information Statements submitted in corresponding Japanese Patent Application No. 2009-178122 and Japanese Patent Application No. 2009-178206 on Apr. 5, 2010.
Notification of Reasons for Refusal dated Mar. 30, 2011 for JP 2009-192229, and a computer-generated English translation thereof.
European Search Report issued in EP 10004942.8 dated Apr. 23, 2012.
Notification for Reasons of Refusal issued in JP 2010-096148 dated Mar. 27, 2012.
Office Action dated May 25, 2012 issued in Chinese Patent Application No. 200910169182.4 with English Translation.

* cited by examiner

FIG. 1

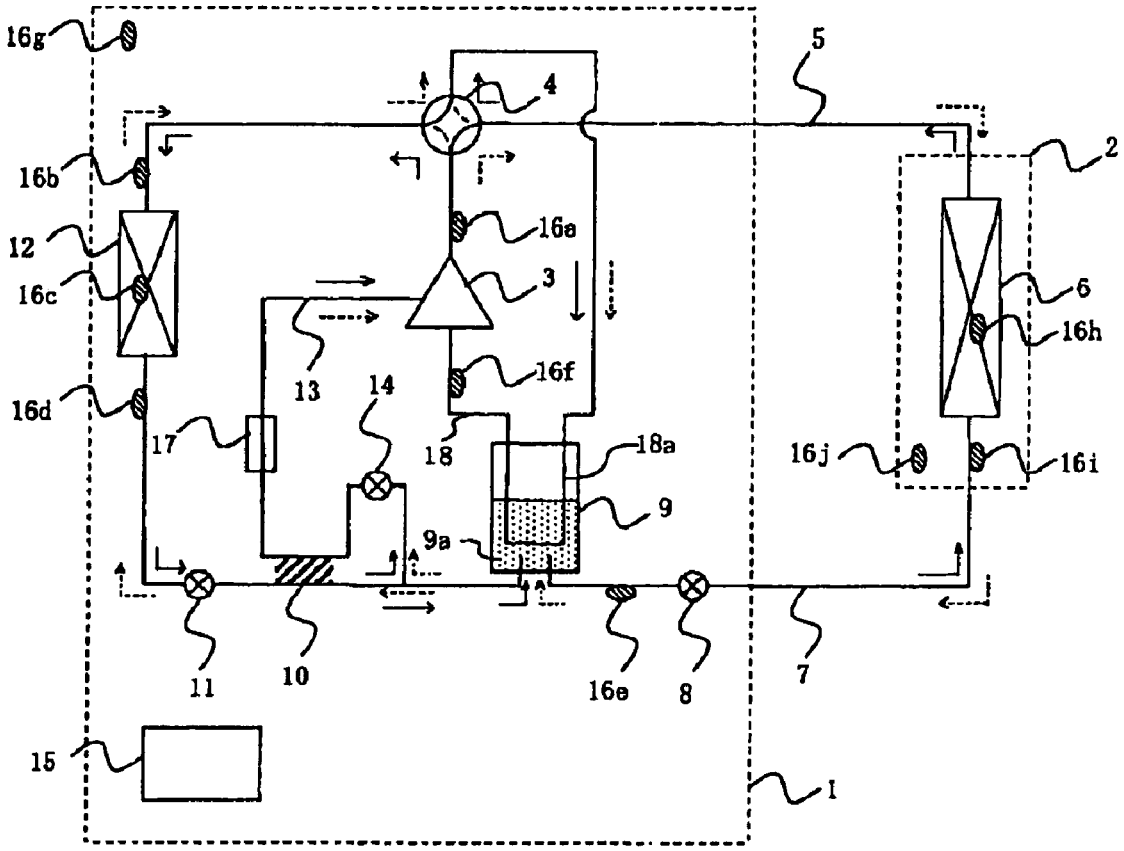

1: OUTDOOR UNIT
2: INDOOR UNIT
3: COMPRESSOR
4: FOUR-WAY VALVE
5: GAS PIPE
6: INDOOR HEAT EXCHANGER
7: LIQUID PIPE
8: THIRD EXPANSION VALVE
9: INTERMEDIATE-PRESSURE RECEIVER
9A: HEAT-EXCHANGE REFRIGERANT
10: SECOND INTERNAL HEAT EXCHANGER
11: FIRST EXPANSION VALVE
12: OUTDOOR HEAT EXCHANGER
13: INJECTION CIRCUIT
14: SECOND EXPANSION VALVE
15: CONTROLLER
17: HEAT SOURCE FOR HEATING REFRIGERANT
18: SUCTION PIPE
18A: THROUGH-PIPE

DEFROSTING OPERATION CHARACTERISTICS WITH OR WITHOUT FIRST INTERNAL HEAT EXCHANGER AND HEAT SOURCE FOR HEATING REFRIGERANT

NEW SHEET

FIG. 13

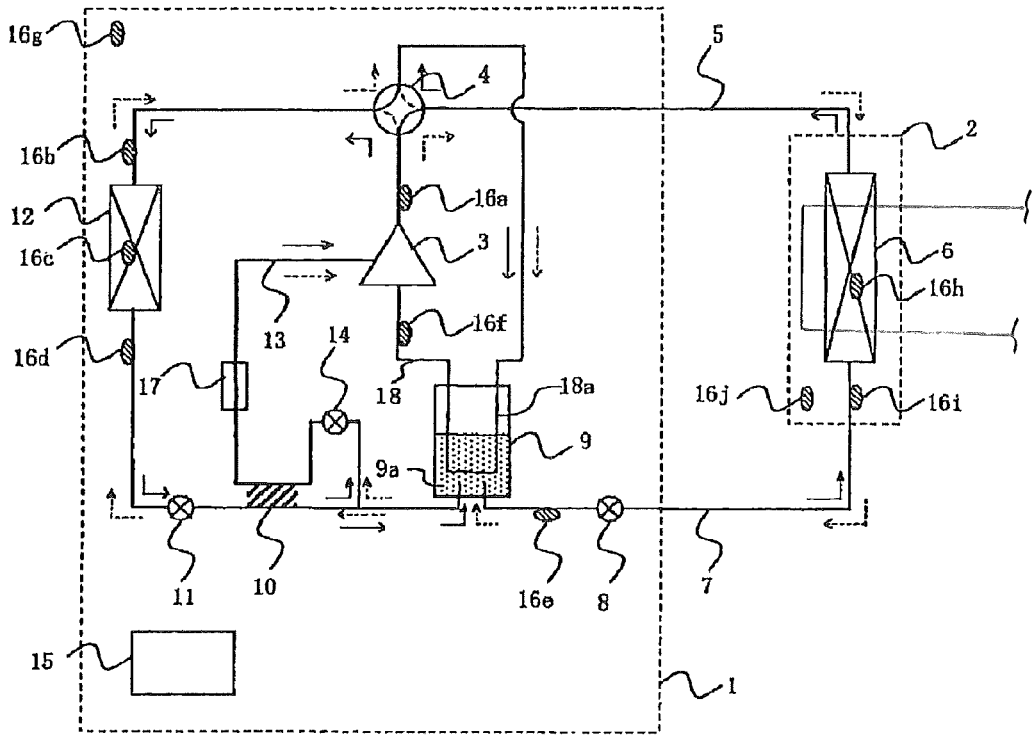

1: OUTDOOR UNIT
2: INDOOR UNIT
3: COMPRESSOR
4: FOUR-WAY VALVE
5: GAS PIPE
6: INDOOR HEAT EXCHANGER
7: LIQUID PIPE
8: THIRD EXPANSION VALVE
9: INTERMEDIATE-PRESSURE RECEIVER
9A: HEAT-EXCHANGE REFRIGERANT
10: SECOND INTERNAL HEAT EXCHANGER
11: FIRST EXPANSION VALVE
12: OUTDOOR HEAT EXCHANGER
13: INJECTION CIRCUIT
14: SECOND EXPANSION VALVE
15: CONTROLLER
17: HEAT SOURCE FOR HEATING REFRIGERANT
18: SUCTION PIPE
18A: THROUGH-PIPE

REFRIGERATION/AIR CONDITIONING EQUIPMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to refrigeration/air conditioning equipment, and particularly to refrigeration/air conditioning equipment in which the heating capacity at low outdoor temperature is improved by gas injection, and a defrosting operation is performed efficiently.

2. Description of the Related Art

Japanese Unexamined Patent Application Publication No. 2001-304714 discloses refrigeration/air conditioning equipment including a gas-liquid separator in an intermediate-pressure portion between a condenser and an evaporator. A gas refrigerant separated by the gas-liquid separator is injected into an intermediate-pressure portion of a compressor to increase the heating capacity.

Japanese Unexamined Patent Application Publication No. 2000-274859 discloses another conventional refrigeration/air conditioning equipment without a gas-liquid separator. In this equipment, part of a high-pressure liquid refrigerant is bypassed, is decompressed, is vaporized through heat exchange with the high-pressure liquid refrigerant. The vaporized refrigerant is injected into a compressor to increase the heating capacity.

Japanese Unexamined Patent Application Publication No. 2001-263882 discloses still another conventional refrigeration/air conditioning equipment, in which a heater for heating a refrigerant is provided to improve the efficiency in a defrosting operation.

However, these pieces of conventional refrigeration/air conditioning equipment have the following problems.

First, as described in the Japanese Unexamined Patent Application Publication No. 2001-304714, when the injection is performed with the gas-liquid separator, the fluid volume in the gas-liquid separator varies with the amount of the injection. This variation causes fluctuations in the distribution of a liquid refrigerant level in a refrigeration cycle and makes the operation unstable.

When the flow rate of a gas refrigerant to be injected is substantially equal to the flow rate of a gas refrigerant in a two-phase refrigerant flowing into the gas-liquid separator, only the liquid refrigerant flows out to an evaporator and therefore the liquid refrigerant level in the gas-liquid separator is substantially constant. However, when the flow rate of the gas refrigerant to be injected is smaller than that of the gas refrigerant flowing into the gas-liquid separator, the gas refrigerant also flows out to the evaporator from the bottom of the gas-liquid separator. Thus, most of the liquid refrigerant in the gas-liquid separator flows out. Conversely, when the flow rate of the refrigerant to be injected increases and the gas refrigerant becomes deficient, the liquid refrigerant is also injected into the compressor. Thus, the liquid refrigerant flows out from the top of the gas-liquid separator, and the gas-liquid separator is almost filled with the liquid refrigerant.

The injection flow rate tends to vary, for example, with the pressure of the refrigeration cycle, the pressure of the gas-liquid separator, or the operation capacity of the compressor.

Thus, the injection flow rate hardly balances with the flow rate of the gas refrigerant flowing into the gas-liquid separator. Actually, the liquid refrigerant level in the gas-liquid separator tends to vary with the operation and be almost zero or full. This variation often causes fluctuations in the distribution of the refrigerant in the refrigeration cycle, making the operation unstable. Furthermore, the heater as in the Japanese Unexamined Patent Application Publication No. 2001-263882 is only used in a defrosting operation and does not contribute significantly to the increase in the capacity during a heating operation.

SUMMARY OF THE INVENTION

In view of these problems, it is an object of the present invention to provide refrigeration/air conditioning equipment that has a higher heating capacity than conventional gas injection cycles, and exhibits a sufficient heating capacity even in a cold district where the outdoor temperature is −10° C. or lower, and also to increase the efficiency during the defrosting operation.

Refrigeration/air conditioning equipment according to the present invention includes:

a compressor;

a four-way valve;

an indoor heat exchanger;

a first decompressor; and an outdoor heat exchanger, wherein these components are coupled circularly, and heat is supplied from the indoor heat exchanger, and the refrigeration/air conditioning equipment further includes:

an intermediate-pressure receiver disposed between the indoor heat exchanger and the first decompressor;

a first internal heat exchanger that exchanges heat between a refrigerant in the intermediate-pressure receiver and a refrigerant in a suction pipe of the compressor; and an injection circuit in which part of a refrigerant between the indoor heat exchanger and the first decompressor is bypassed and is injected into a compression chamber in the compressor, wherein the injection circuit includes:

a second decompressor;

a second internal heat exchanger that exchanges heat between a refrigerant having a pressure reduced by the second decompressor and the refrigerant between the indoor heat exchanger and the first decompressor; and a heat source for heating a refrigerant disposed between the second internal heat exchanger and the compressor.

Thus, even when a high flow rate of the gas refrigerant is injected, sufficient heating capacity can be provided even under such a condition as the heating capacity tends to decrease owing to low outdoor temperature or the like, by preventing the reduction in the discharge temperature of the compressor and allowing the indoor heat exchanger to exhibit sufficient heat-exchange performance. According to the present invention, the gas refrigerant to be injected is supplied not from the gas-liquid separator but through the gasification of the bypassed refrigerant with the second internal heat exchanger. Thus, the variation in the fluid volume caused by the gas-liquid separator can be avoided. Thus, more stable operation can be achieved. In addition, the gas injection can be increased while the reduction in the discharge temperature of the compressor is prevented. Thus, the heating capacity is further increased, and the efficiency during the defrosting operation is improved.

BRIEF DESCRIPTION OF THE DRAWINGS

FIG. 1 is a refrigerant circuit diagram of refrigeration/air conditioning equipment according to Embodiment 1 of the present invention;

*FIG. 13 is a refrigeration circuit diagram which shows the load side medium that exchanges heat with the refrigerant discharged from the compressor in the second heat exchanger being water.*

DESCRIPTION OF THE PREFERRED EMBODIMENTS

Embodiment 1

Figure 2:
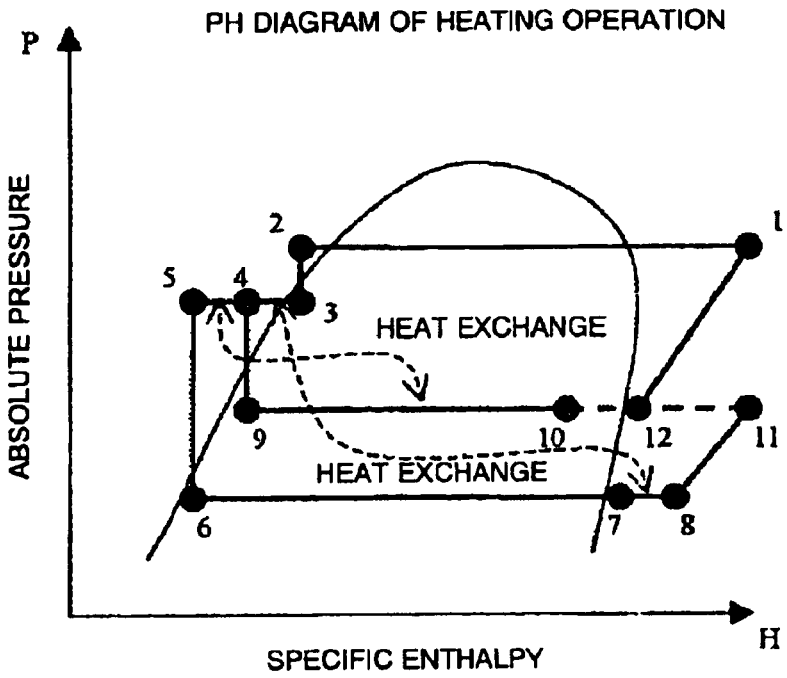
FIG. 2 is a PH diagram showing the heating operation of the refrigeration/air conditioning equipment according to Embodiment 1 of the present invention.

FIG. 1 is a refrigerant circuit diagram of refrigeration/air conditioning equipment of Embodiment 1 according to the present invention. In FIG. 1, an outdoor unit 1 includes a compressor 3, a four-way valve 4 for switching between heating and cooling, an outdoor heat exchanger 12, a first expansion valve 11 serving as a first decompressor, a second internal heat exchanger 10, a third expansion valve 8 serving as a third decompressor, an injection circuit 13, a second expansion valve 14 serving as a second decompressor, an intermediate-pressure receiver 9, and a heat source 17 for heating a refrigerant. A suction pipe 18 of the compressor 3 passes through the intermediate-pressure receiver 9. Thus, a refrigerant in this through-pipe 18a of the suction pipe 18 can exchange heat with a refrigerant 9a in the intermediate-pressure receiver 9. The heat source 17 heats a refrigerant circulating through the injection circuit 13.

The capacity of the compressor 3 can be controlled by adjusting the number of revolutions with an inverter. The compressor 3 is designed such that the refrigerant supplied from the injection circuit 13 can be injected into a compression chamber in the compressor 3. The first expansion valve 11, the second expansion valve 14, and the third expansion valve 8 are electronic expansion valves whose degree of opening is variable. The outdoor heat exchanger 12 exchanges heat with the outside air sent by a fan or the like. An indoor unit 2 includes an indoor heat exchanger 6. A gas pipe 5 and a liquid pipe 7 are connecting pipes to connect the outdoor unit 1 and the indoor unit 2. The refrigeration/air conditioning equipment uses a mixed HFC-based refrigerant, R410A as a refrigerant.

The outdoor unit 1 includes a controller 15 and temperature sensors 16. A first temperature sensor 16a is disposed at the discharge side of the compressor 3, a second temperature sensor 16b is disposed between the outdoor heat exchanger 12 and the four-way valve 4, a third temperature sensor 16c is disposed on a refrigerant pass in a intermediate portion of the outdoor heat exchanger 12, a fourth temperature sensor 16d is disposed between the outdoor heat exchanger 12 and the first expansion valve 11, a fifth temperature sensor 16e is disposed between the intermediate-pressure receiver 9 and the third expansion valve 8, and a sixth temperature sensor 16f is disposed at the suction side of the compressor 3. These temperature sensors measure the refrigerant temperatures at their respective installation locations. A seventh temperature sensor 16g measures the outdoor temperature around the outdoor unit 1.

An eighth temperature sensor 16h, a ninth temperature sensor 16i, and a tenth temperature sensor 16j are disposed in the indoor unit 2. The eighth temperature sensor 16h is disposed on a refrigerant pass in an intermediate portion of the indoor heat exchanger 6, and the ninth temperature sensor 16i is disposed between the indoor heat exchanger 6 and the liquid pipe 7. These temperature sensors measure the refrigerant temperatures at their respective installation locations. The tenth temperature sensor 16j measures the temperature of air sucked into the indoor heat exchanger 6. When the load medium is another medium, such as water, the tenth temperature sensor 16j measures the temperature of the medium flowing into the indoor heat exchanger 6.

The third temperature sensor 16c and the eighth temperature sensor 16h measures the temperatures of the refrigerant in a gas-liquid two phase in the intermediate portion of each heat exchanger, and thereby can determine the saturation temperatures of the refrigerant under high pressure and low pressure.

The metering and control system 15 in the outdoor unit 1 controls the operational mode of the compressor 3, pass switching of the four-way valve 4, the amount of air sent by a fan in the outdoor heat exchanger 12, and the degrees of opening of the first expansion valve, the second expansion valve, and the third expansion valve according to the measured information of the temperature sensors 16a to 16j and operating conditions instructed by a user of the refrigeration/air conditioning equipment.

The operation of the refrigeration/air conditioning equipment will be described below. First, the heating operation will be described with reference to the refrigerant circuit diagram shown in FIG. 1 and the PH diagram of the heating operation shown in FIG. 2. In the heating operation, the flow pass of the four-way valve 4 is set in the direction of the dotted line shown in FIG. 1. A high-temperature high-pressure gas refrigerant (FIG. 2, point 1) discharged from the compressor 3 flows out from the outdoor unit 1 via the four-way valve 4, and flows into the indoor unit 2 through the gas pipe 5. The gas refrigerant flows into the indoor heat exchanger 6, which serves as a condenser, loses its heat, and is condensed to a high-pressure low-temperature liquid refrigerant (FIG. 2, point 2). The heat radiating from the refrigerant is transferred to the load medium, such as air or water, which heats the room. The high-pressure low-temperature refrigerant flowing out from the indoor heat exchanger 6 flows into the outdoor unit 1 through the liquid pipe 7 and is slightly decompressed with the third expansion valve 8 (FIG. 2, point 3), changing into a gas-liquid two-phase refrigerant, which flows into the intermediate-pressure receiver 9. The two-phase refrigerant transfers heat to a low-temperature refrigerant that is to be sucked into the compressor 3 in the intermediate-pressure receiver 9, is cooled into a liquid phase (FIG. 2, point 4), and flows out from the intermediate-pressure receiver 9. One part of the liquid refrigerant is bypassed through the injection circuit 13, is decompressed, and is decreased in temperature through the second expansion valve 14. The other part of the liquid refrigerant is further cooled by the heat exchange with the bypassed refrigerant in the second internal heat exchanger 10 (FIG. 2, point 5). The other part of the liquid refrigerant is decompressed in the first expansion valve 11 and changes into a two-phase refrigerant (FIG. 2, point 6). Then, the two-phase refrigerant flows into the outdoor heat exchanger 12, which serves as an evaporator, and absorbs heat to vaporize (FIG. 2, point 7). The gas refrigerant flows through the four-way valve 4, is heated by heat exchange with the high-pressure refrigerant in the intermediate-pressure receiver 9 (FIG. 2, point 8), and is sucked into the compressor 3.

On the other hand, the refrigerant bypassed through the injection circuit 13 is decompressed to an intermediate pressure with the second expansion valve 14 and changes into a low-temperature two-phase refrigerant (FIG. 2, point 9). Then, the low-temperature two-phase refrigerant exchanges heat with the high-pressure refrigerant in the second internal heat exchanger 10, is heated by the heat source 17 (FIG. 2, point 10), and is injected into the compressor 3. In the compressor 3, the sucked refrigerant (FIG. 2, point 8) is compressed to an intermediate pressure, is heated (FIG. 2, point 11), and is merged into the injected refrigerant. The merged refrigerant having a reduced temperature (FIG. 2, point 12) is compressed to a high pressure and is discharged (FIG. 2, point 1). The heat source 17 for heating a refrigerant can adjust the amount of heat when necessary.

Figure 3:
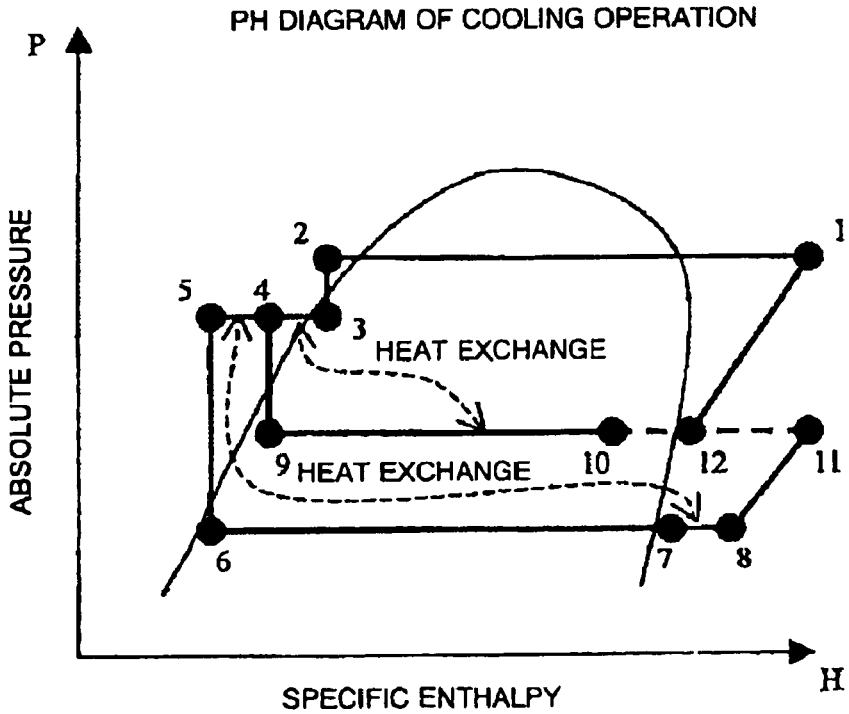
FIG. 3 is a PH diagram showing the cooling operation of the refrigeration/air conditioning equipment according to Embodiment 1 of the present invention.

Next, the cooling operation will be described with reference to the refrigerant circuit diagram shown in FIG. 1 and the PH diagram of the cooling operation shown in FIG. 3. In the cooling operation, the flow pass of the four-way valve 4 is set in the direction of the solid line shown in FIG. 1. A high-temperature high-pressure gas refrigerant (FIG. 3, point 1) discharged from the compressor 3 flows into the outdoor heat exchanger 12, which serves as a condenser, via the four-way valve 4. The gas refrigerant loses its heat and is condensed to a high-pressure low-temperature refrigerant (FIG. 3, point 2). The high-pressure low-temperature refrigerant flowing out from the outdoor heat exchanger 12 is slightly decompressed with the first expansion valve 11 (FIG. 3, point 3). The refrigerant is cooled by heat exchange with a low-temperature refrigerant flowing through the injection circuit 13 in the second internal heat exchanger 10 (FIG. 3, point 4). One part of the refrigerant is bypassed through the injection circuit 13. The other part of the refrigerant is cooled by the heat exchange with the refrigerant that is to be sucked into the compressor 3 in the intermediate-pressure receiver 9 (FIG. 3, point 5). The other part of the refrigerant is decompressed to a low pressure in the third expansion valve 8, changing into a two-phase refrigerant (FIG. 3, point 6). Then, the refrigerant flows from the outdoor unit 1 to the indoor unit 2 through the liquid pipe 7. Then, the two-phase refrigerant flows into the indoor heat exchanger 6, which serves as an evaporator. The refrigerant absorbs heat to evaporate (FIG. 3, point 7) while it supplies cold energy to the load medium, such as air or water, in the indoor unit 2. The low-pressure gas refrigerant flowing out from the indoor heat exchanger 6 flows from the indoor unit 2 to the outdoor unit 1 through the gas pipe 5. The gas refrigerant flows through the four-way valve 4, is heated by heat exchange with the high-pressure refrigerant in the intermediate-pressure receiver 9 (FIG. 3, point 8), and is sucked into the compressor 3.

On the other hand, the refrigerant bypassed through the injection circuit 13 is decompressed to an intermediate pressure with the second expansion valve 14 and changes into a low-temperature two-phase refrigerant (FIG. 3, point 9). Then, the low-temperature two-phase refrigerant exchanges heat with the high-pressure refrigerant in the second internal heat exchanger 10, is heated in the heat source 17 (FIG. 3, point 10), and is injected into the compressor 3. In the compressor 3, the sucked refrigerant (FIG. 3, point B) is compressed to an intermediate pressure, is heated (FIG. 3, point 11), and is merged into the injected refrigerant. The merged refrigerant having a reduced temperature (FIG. 3, point 12) is again compressed to a high pressure and is discharged (FIG. 3, point 1). The heat source 17 for heating a refrigerant can adjust the amount of heat when necessary.

The PH diagram of the cooling operation is almost identical with that of the heating operation. Thus, similar operations can be achieved in both operation modes.

Figure 4:
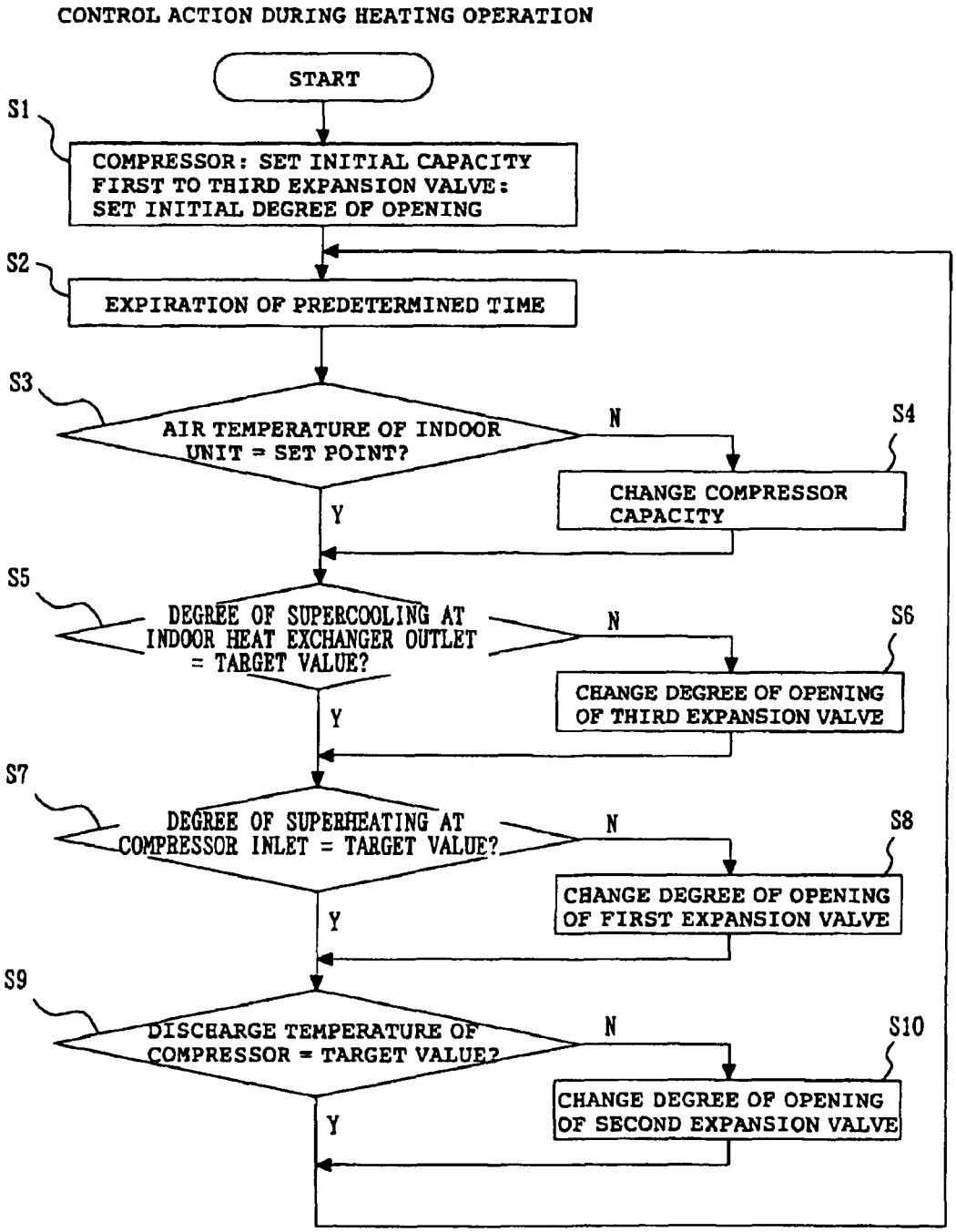
FIG. 4 is a flow chart showing the control action during the heating operation of the refrigeration/air conditioning equipment according to Embodiment 1 of the present invention.

The control action of the refrigeration/air conditioning equipment will be explained below. First, the control action in the heating operation will be described with reference to FIG. 4. FIG. 4 is a flow chart showing the control action in the heating operation. In the heating operation, the capacity of the compressor 3, the degree of opening of the first expansion valve 11, the degree of opening of the second expansion valve 14, and the degree of opening of the third expansion valve 8 are set to initial values at step S1. At step S2, after the expiration of a predetermined time, each actuator is controlled as follows in a manner that depends on its operational status. The capacity of the compressor 3 is basically controlled such that the air temperature measured with the tenth temperature sensor 16j in the indoor unit 2 is equal to a temperature set by a user of the refrigeration/air conditioning equipment.

In other words, the air temperature of the indoor unit 2 is compared with the set temperature at step S3. When the air temperature is the same as or close to the set temperature, the capacity of the compressor 3 is maintained to proceed to the step S5. When the air temperature is different from the set temperature, the capacity of the compressor 3 is adjusted at step S4 in the following manner. When the air temperature is much lower than the set temperature, the capacity of the compressor 3 is increased. When the air temperature is much higher than the set temperature, the capacity of the compressor 3 is decreased.

Each expansion valve is controlled in the following manner. The third expansion valve 8 is controlled such that the degree of supercooling SC of the refrigerant at the outlet of the indoor heat exchanger 6, which is obtained from the difference between the saturation temperature of the high-pressure refrigerant measured by the eighth temperature sensor 16h and the outlet temperature of the indoor heat exchanger 6 measured by the ninth temperature sensor 16i, is equal to a predetermined target value, for example, 10° C. The degree of supercooling SC of the refrigerant at the outlet of the indoor heat exchanger 6 is compared with the target value at step S5. When the degree of supercooling SC of the refrigerant is greater than the target value at the step S5, the degree of opening of the third expansion valve 8 is increased at step 6. When the degree of supercooling SC of the refrigerant is smaller than the target value at the step 5, the degree of opening of the third expansion valve 8 is decreased at the step S6.

The first expansion valve 11 is controlled such that the degree of superheat SH of the refrigerant sucked into the compressor 3, which is obtained from the difference between the suction temperature of the compressor 3 measured by the sixth temperature sensor 16f and the saturation temperature of the low-pressure refrigerant measured by the third temperature sensor 16c, is equal to a predetermined target value, for example, 10° C. In other words, the degree of superheat SH of the refrigerant, which is the temperature of the refrigerant sucked into the compressor 3, is compared with the target value at step S7. When the degree of superheat SH of the refrigerant sucked into the compressor 3 is equal or close to the target value, the degree of opening of the first expansion valve 11 is maintained to proceed to the next step S9. When the degree of superheat SH is different from the target value, the degree of opening of the first expansion valve 11 is changed at step S8 in the following manner. When the degree of superheat SH of the refrigerant sucked into the compressor 3 is greater than the target value, the degree of opening of the first expansion valve 11 is increased, and when the degree of superheat SH of the refrigerant is smaller than the target value, the degree of opening of the first expansion valve 11 is decreased.

Next, the second expansion valve 14 is controlled such that the discharge temperature of the compressor 3 measured by the first temperature sensor 16a is equal to a predetermined target value, for example, 90° C. In other words, the discharge temperature of the compressor 3 is compared with the target value at step S19. When the discharge temperature of the compressor 3 is equal or close to the target value at the step S9, the degree of opening of the second expansion valve 14 is maintained and the operation loops back to the step 2.

When the degree of opening of the second expansion valve 14 is changed, the state of the refrigerant changes as follows. When the degree of opening of the second expansion valve 14 increases, the flow rate of the refrigerant flowing into the injection circuit 13 increases. The amount of heat exchanged in the second internal heat exchanger 10 does not change significantly with the flow rate of the refrigerant in the injection circuit 13. Thus, when the flow rate of the refrigerant flowing through the injection circuit 13 increases, the enthalpy difference of the refrigerant (FIG. 2, difference between point 9 and point 10) in the injection circuit 13 at the second internal heat exchanger 10 decreases. Thus, the enthalpy of the refrigerant to be injected (FIG. 2, point 10) decreases.

Accordingly, after the injected refrigerant is merged, the enthalpy of the refrigerant (FIG. 2, point 12) decreases. This also decreases the enthalpy and the temperature of the refrigerant discharged from the compressor 3 (FIG. 2, point 1). Conversely, when the degree of opening of the second expansion valve 14 decreases, the enthalpy and the temperature of the refrigerant discharged from the compressor 3 increase. Thus, the degree of opening of the second expansion valve 14 is controlled at step S10 such that when the discharge temperature of the compressor 3 is higher than a target value, the degree of opening of the second expansion valve 14 is increased, and when the discharge temperature is lower than the target value, the degree of opening of the second expansion valve 14 is decreased. Then, the operation loops back to the step 2.

Figure 5:
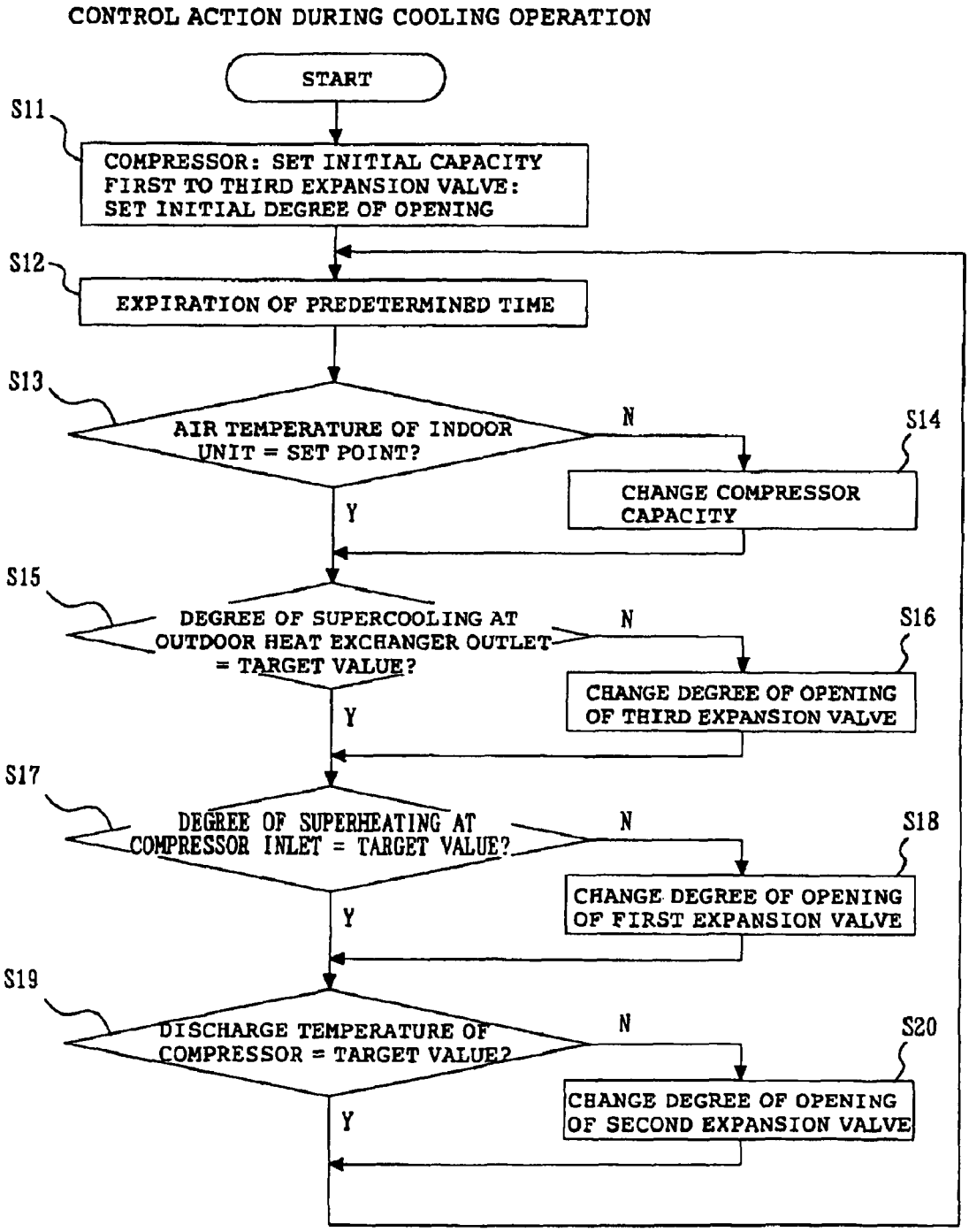
FIG. 5 is a flow chart showing the control action during the cooling operation of the refrigeration/air conditioning equipment according to Embodiment 1 of the present invention.

Next, the control action during the cooling operation will be described with reference to FIG. 5. FIG. 5 is a flow chart showing the control action in the cooling operation. In the cooling operation, the capacity of the compressor 3, the degree of opening of the first expansion valve 11, the degree of opening of the second expansion valve 14, and the degree of opening of the third expansion valve 8 are set to initial values at step S11. At step S12, after the expiration of a predetermined time, each actuator is controlled as follows in a manner that depends on its operational status.

First, the capacity of the compressor 3 is basically controlled such that the air temperature measured with the tenth temperature sensor 16j in the indoor unit 2 is equal to a temperature set by a user of the refrigeration/air conditioning equipment. In other words, the air temperature of the indoor unit 2 is compared with the set temperature at step S13. When the air temperature is the same as or close to the set temperature, the capacity of the compressor 3 is maintained to proceed to step S15. When the air temperature is different from the set temperature the capacity of the compressor 3 is adjusted at step S14 in the following manner. When the air temperature is much higher than the set temperature, the capacity of the compressor 3 is increased. When the air temperature is lower than the set temperature, the capacity of the compressor 3 is decreased.

Each expansion valve is controlled in the following manner. The first expansion valve 11 is controlled such that the degree of supercooling SC of the refrigerant at the outlet of the outdoor heat exchanger 12, which is obtained from the difference between the saturation temperature of the high-pressure refrigerant measured by the temperature sensor 16c and the outlet temperature of the outdoor heat exchanger 12 measured by the temperature sensor 16d, is equal to a predetermined target value, for example, 10° C. In other words, the degree of supercooling SC of the refrigerant at the outlet of the outdoor heat exchanger 12 is compared with the target value at step S15. When the degree of supercooling SC at the outlet of the outdoor heat exchanger 12 is equal or close to the target value, the degree of opening of the first expansion valve 11 is maintained to proceed to the next step S17. The degree of opening of the first expansion valve 11 is changed at step S16 such that when the degree of supercooling SC at the outlet of the outdoor heat exchanger 12 is greater than the target value, the degree of opening of the first expansion valve 11 is increased, and when the degree of supercooling SC of the refrigerant is smaller than the target value, the degree of opening of the first expansion valve 11 is decreased.

Next, the third expansion valve 8 is controlled such that the degree of superheat SH of the refrigerant sucked into the compressor 3, which is obtained from the difference between the suction temperature of the compressor 3 measured by the sixth temperature sensor 16f and the saturation temperature of the low-pressure refrigerant measured by the eight temperature sensor 16h, is equal to a predetermined target value, for example, 10° C. In other words, the degree of superheat SH of the refrigerant sucked into the compressor 3 is compared with the target value at step S17. When the degree of superheat SH of the refrigerant sucked into the compressor 3 is equal or close to the target value, the degree of opening of the third expansion valve 8 is maintained to proceed to the next step S19. When the degree of superheat SH is different from the target value, the degree of opening of the third expansion valve 8 is changed at step S18 such that when the degree of superheat SH of the refrigerant sucked into the compressor 3 is greater than the target value, the degree of opening of the third expansion valve 8 is increased, and when the degree of superheat SH of the refrigerant is smaller than the target value, the degree of opening of the third expansion valve B is decreased.

Next, the second expansion valve 14 is controlled such that the discharge temperature of the compressor 3 measured by the first temperature sensor 16a is equal to a predetermined target value, for example, 90° C. In other words, the discharge temperature of the compressor 3 is compared with the target value at step S19. When the discharge temperature of the compressor 3 is equal or close to the target value, the degree of opening of the second expansion valve 14 is maintained and the operation loops back to the step 12. The variations in the state of the refrigerant at the time when the degree of opening of the second expansion valve 14 is changed are similar to those in the heating operation. Thus, the degree of opening of the second expansion valve 14 is controlled such that when the discharge temperature of the compressor 3 is higher than the target value, the degree of opening of the second expansion valve 14 is increased, and when the discharge temperature is lower than the target value, the degree of opening of the second expansion valve 14 is decreased. Then, the operation loops back to the step S12.

Next, the circuitry of the Embodiment 1 and operations and effects achieved by the controls will be described. Since both the cooling operation and the heating operation can be performed in a similar way in this equipment, the heating operation is representatively described below. The circuitry of the equipment is a so-called gas injection circuit. In other words, after the refrigerant flows out from the indoor heat exchanger 6, which serves as a condenser, and is decompressed to an intermediate pressure, a gas component of the refrigerant is injected into a compressor 3.

In typical refrigeration/air conditioning equipment, the intermediate-pressure refrigerant is often separated into liquid and gas with a gas-liquid separator and is then injected. However, in the refrigeration/air conditioning equipment according to this embodiment, as shown in FIG. 6, the refrigerant is thermally separated into liquid and gas by heat exchange in the second internal heat exchanger 10, and is then injected.

The gas injection circuit has the following effects. The gas injection increases the flow rate of the refrigerant discharged from the compressor 3: the flow rate of the refrigerant discharged from the compressor 3 Gdis=the flow rate of the refrigerant sucked into the compressor 3 Gsuc+the flow rate of the injected refrigerant Ginj. This increases the flow rate of the refrigerant flowing into the heat exchanger, which serves as a condenser, and thereby increases the heating capacity in the heating operation.

Figure 6:
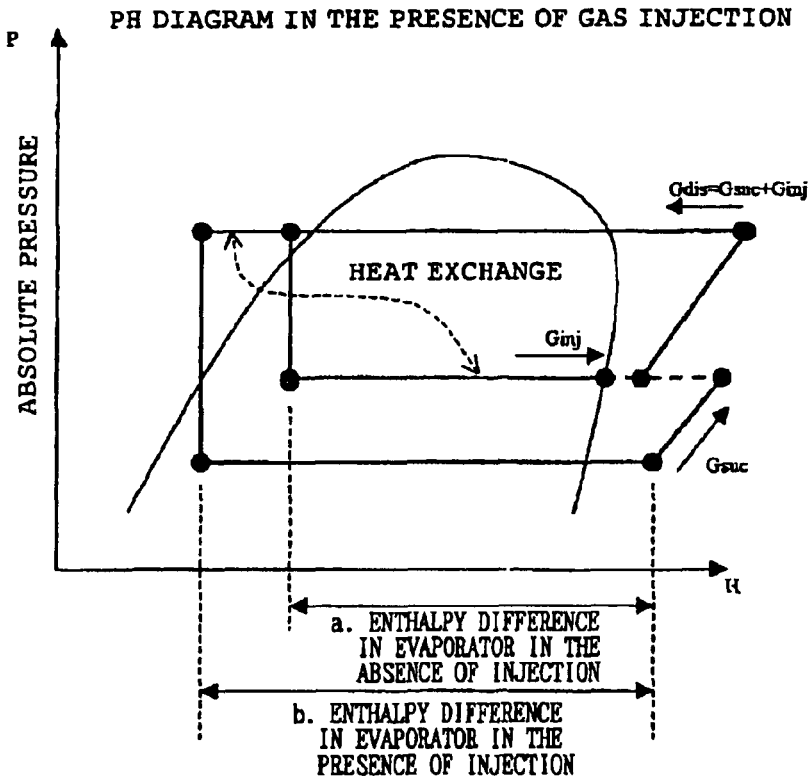
FIG. 6 is a PH diagram showing the operation of the refrigeration/air conditioning equipment according to Embodiment 1 of the present invention in the presence of gas injection.

On the other hand, as shown in FIG. 6, the heat exchange in the second internal heat exchanger 10 decreases the enthalpy of the refrigerant flowing into the heat exchanger, which serves as an evaporator. Thus, the difference in the enthalpy of the refrigerant in the evaporator increases. Accordingly, the cooling capacity also increases in the cooling operation.

Furthermore, the gas injection also improves the efficiency. The refrigerant flowing into the heat exchanger, which serves as an evaporator, is generally a gas-liquid two-phase refrigerant, the gas component of which does not contribute to cooling capacity. However, the compressor 3 does work of increasing the pressure of this low-pressure gas refrigerant, in addition to the gas refrigerant vaporized in the evaporator. In the gas injection, part of the gas refrigerant flowing into the evaporator is drawn at an intermediate pressure, is injected into the compressor 3, and is compressed from the intermediate pressure to high pressure. Thus, there is no need to compress the gas refrigerant to be injected from low pressure to intermediate pressure. This improves the efficiency. This effect can be achieved in both the heating operation and the cooling operation.

Figure 7:
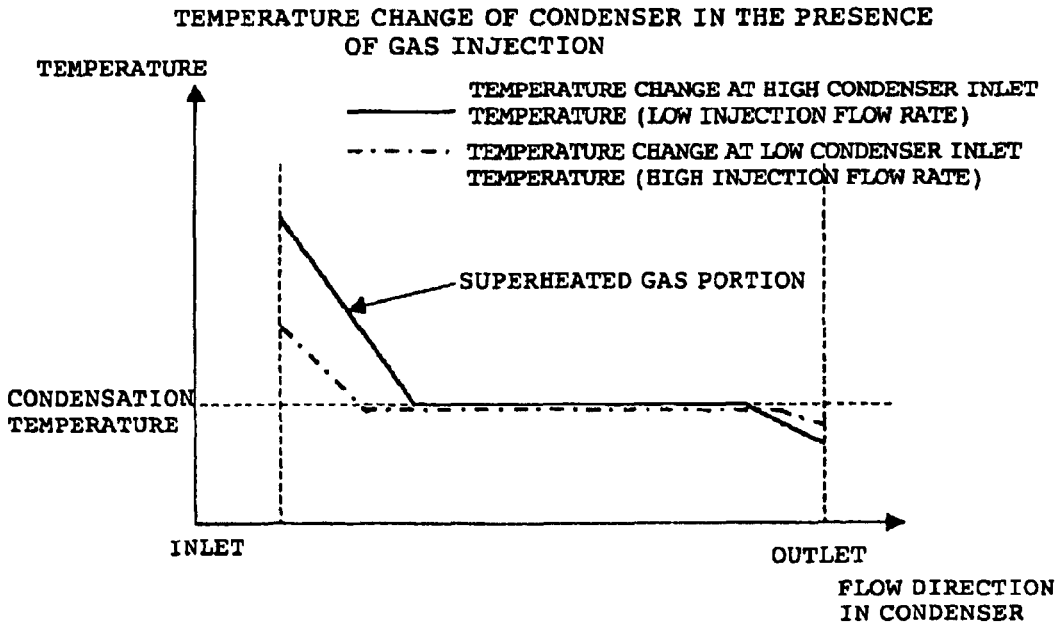
FIG. 7 is a diagram showing the temperature change of a condenser in the refrigeration/air conditioning equipment according to Embodiment 1 of the present invention in the presence of gas injection.

Next, the correlation between the gas-injection flow rate and the heating capacity will be described. When the gas-injection flow rate is increased, as described above, the flow rate of the refrigerant discharged from the compressor 3 increases, but the discharge temperature of the compressor 3 decreases, and the temperature of the refrigerant flowing into the indoor heat exchanger 6, which serves as a condenser, also decreases. In terms of the heat-exchange performance of the condenser, the amount of exchanged heat generally increases as the temperature distribution in the heat exchanger extends. FIG. 7 shows the changes in the refrigerant temperature at the time when the condensation temperatures are the same but the refrigerant temperatures at the inlet of the condenser are different. The temperature distributions at a portion where the refrigerant in the condenser is in a superheated gas state are different.

Figure 8:
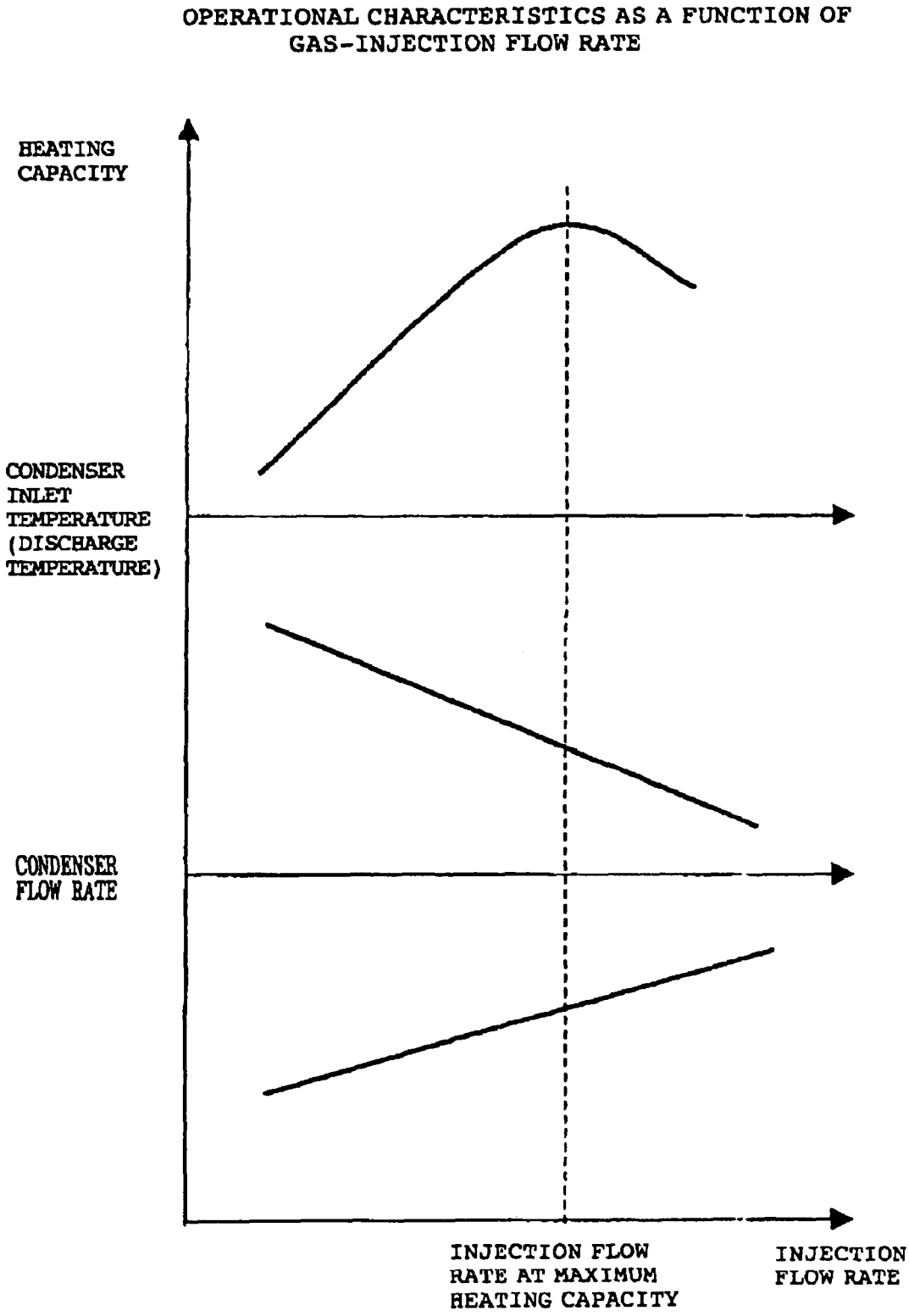
FIG. 8 is a diagram showing the operation characteristics of the refrigeration/air conditioning equipment according to Embodiment 1 of the present invention as a function of the gas-injection flow rate.

In the condenser, although the amount of heat exchanged in the refrigerant in a two-phase state at the condensation temperature dominates, the amount of heat exchanged at a portion where the refrigerant is in a superheated gas state accounts for about 20% to 30% of the total amount of exchanged heat and has a significant impact on the amount of exchanged heat. If an injection flow rate is too high and the refrigerant temperature at a portion where the refrigerant is in a superheated gas state lowers drastically, heat-exchange performance in the condenser will decrease, resulting in low heating capacity. FIG. 8 shows the correlation between the gas-injection flow rate and the heating capacity. The heating capacity reaches the maximum at a certain gas-injection flow rate.

Next, operations and effects of heat exchange in the intermediate-pressure receiver 9 between the refrigerant 9a for exchanging heat and the through-pipe 18a in the suction pipe 18 of the compressor 3 according to the Embodiment 1 will be described. In the heating operation, the gas-liquid two-phase refrigerant flows into the intermediate-pressure receiver 9 from the third expansion valve 8. The gas-liquid two-phase refrigerant is cooled by the heat exchange between the through-pipe 18a in the suction pipe 18 of the compressor 3 and the refrigerant 9a in the intermediate-pressure receiver 9, and flows out as a liquid refrigerant. In the cooling operation, the gas-liquid two-phase refrigerant at the outlet of the second internal heat exchanger 10 flows into the intermediate-pressure receiver 9, is cooled, and flows out as a liquid refrigerant. Thus, the enthalpy of the refrigerant flowing into the indoor heat exchanger 6, which serves as an evaporator, decreases. This increases the difference in the enthalpy of the refrigerant in the evaporator. Accordingly, the cooling capacity also increases in the cooling operation.

On the other hand, the refrigerant to be sucked into the compressor 3 is heated, and the suction temperature increases. This also increases the discharge temperature of the compressor 3. In the compression stroke of the compressor 3, the compression of the refrigerant having a higher temperature generally requires a greater amount of work for the same pressure increase. Thus, the effect on the efficiency of the heat exchange in the intermediate-pressure receiver 9 between the refrigerant 9a for exchanging heat and the through-pipe 18a in the suction pipe 18 of the compressor 3 influences both the increase in the performance due to the greater enthalpy difference in the evaporator and the increase in work of compression. When the increase in the performance due to the greater enthalpy difference in the evaporator has a greater influence, the operational efficiency of the equipment increases.

The heat exchange in the intermediate-pressure receiver between the refrigerant 9a and the through-pipe 18a in the suction pipe 18 is mainly performed by a gas refrigerant in the gas-liquid two-phase refrigerant coming into contact with the through-pipe 18a in the suction pipe 18 and condensing into liquid. Thus, when the liquid refrigerant left in the intermediate-pressure receiver 9 decreases, the contact area between the gas refrigerant and the through-pipe 18a in the suction pipe 18 increases. This increases the amount of heat exchanged. Conversely, when the liquid refrigerant left in the intermediate-pressure receiver 9 increases, the contact area between the gas refrigerant and the through-pipe 18a in the suction pipe 18 decreases. This decreases the amount of heat exchanged.

Thus, the intermediate-pressure receiver 9 has the following effects. First, since the refrigerant flowing out the intermediate-pressure receiver 9 is liquid, the refrigerant flowing into the second expansion valve 14 in the heating operation is always a liquid refrigerant. This stabilizes the flow rate of the second expansion valve 14 and ensures stable control and stable operation.

Furthermore, the heat exchange in the intermediate-pressure receiver 9 stabilizes the pressure of the intermediate-pressure receiver 9, the inlet pressure of the second expansion valve 14, and the flow rate of the refrigerant flowing into the injection circuit 13. For example, load fluctuations and associated fluctuations in the high pressure side cause fluctuations in the pressure of the intermediate-pressure receiver 9. The heat exchange in the intermediate-pressure receiver 9 reduces such pressure fluctuations. When the load increases and the high pressure increases, the pressure of the intermediate-pressure receiver 9 also increases. This increases the pressure difference from the low pressure. This also increases the temperature difference in the heat exchange in the intermediate-pressure receiver 9, thus increasing the amount of exchanged heat. The increase in the amount of exchanged heat enhances the condensation of the gas component of the gas-liquid two-phase refrigerant flowing into the intermediate-pressure receiver 9, thus suppressing the pressure increase. Thus, the pressure increase of the intermediate-pressure receiver 9 is prevented. Conversely, when the load decreases and the high pressure decreases, the pressure of the intermediate-pressure receiver 9 also decreases. This reduces the pressure difference from the low pressure. This also reduces the temperature difference in the heat exchange in the intermediate-pressure receiver 9, thus decreasing the amount of exchanged heat. The decrease in the amount of exchanged heat prevents the condensation of the gas component of the gas-liquid two-phase refrigerant flowing into the intermediate-pressure receiver 9, suppressing the pressure decrease. Thus, the pressure decrease of the intermediate-pressure receiver 9 is prevented.

In this way, the heat exchange in the intermediate-pressure receiver 9 autonomously generates variations in the amount of exchanged heat, following the fluctuations in the operational status. This prevents the pressure fluctuations of the intermediate-pressure receiver 9.

Furthermore, the heat exchange in the intermediate-pressure receiver 9 stabilizes the operation of the equipment. For example, when the state of the low-pressure side changes and the degree of superheat of the refrigerant at the outlet of the outdoor heat exchanger 12 serving as an evaporator increases, the temperature difference in the heat exchange in the intermediate-pressure receiver 9 decreases. Thus, the amount of heat exchanged decreases, and therefore the gas refrigerant is hardly condensed. This increases the gas refrigerant level and decreases the liquid refrigerant level in the intermediate-pressure receiver 9. The decrement of the liquid refrigerant is carried over into the outdoor heat exchanger 12, increasing the liquid refrigerant level in the outdoor heat exchanger 12. This suppresses the increase in the degree of superheat of the refrigerant at the outlet of the outdoor heat exchanger 12, thus suppressing the operational fluctuations of the equipment. Conversely, when the state of the low-pressure side changes and the degree of superheat of the refrigerant at the outlet of the outdoor heat exchanger 12 serving as an evaporator decreases, the temperature difference in the heat exchange in the intermediate-pressure receiver 9 increases. Thus, the amount of exchanged heat increases, and therefore the gas refrigerant is easily condensed. This decreases the gas refrigerant level and increases the liquid refrigerant level in the intermediate-pressure receiver 9. The increment of the liquid refrigerant is derived from the outdoor heat exchanger 12, thus decreasing the liquid refrigerant level in the outdoor heat exchanger 12. This suppresses the decrease in the degree of superheat of the refrigerant at the outlet of the outdoor heat exchanger 12, thus suppressing the operational fluctuations of the equipment.

The suppression of the fluctuations in the degree of superheat also results from autonomous generation of the variations in the amount of exchanged heat, following the fluctuations in the operational status, through the heat exchange in the intermediate-pressure receiver 9.

Figure 9:
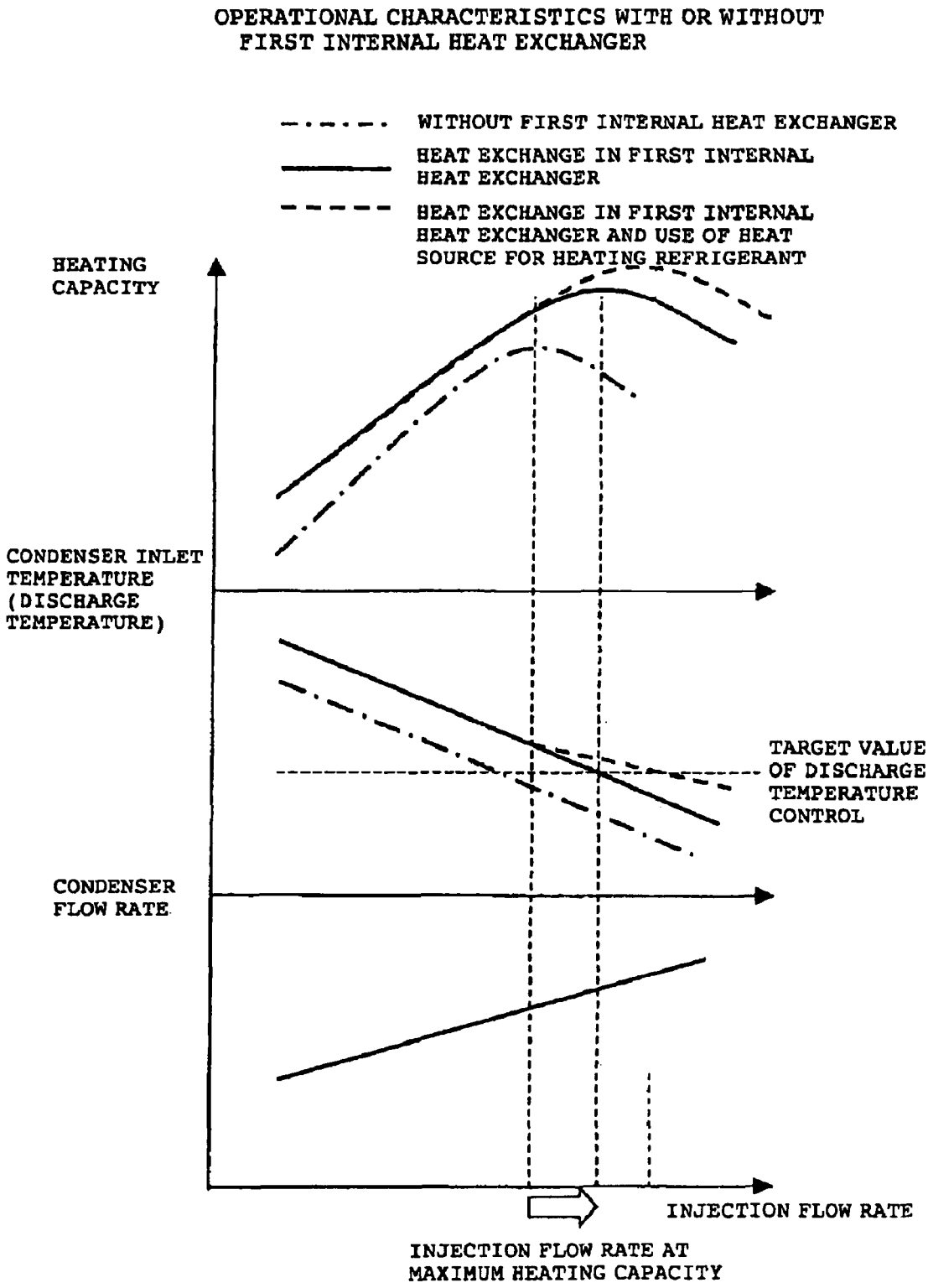
FIG. 9 is a diagram showing the operation characteristics of the refrigeration/air conditioning equipment according to Embodiment 1 of the present invention with or without a first internal heat exchanger.

Next, as in the Embodiment 1, the effect of the heat exchange in the intermediate-pressure receiver 9 in combination with the gas injection from the injection circuit 13 will be described. The heat exchange in the intermediate-pressure receiver 9 increases the suction temperature of the compressor 3. Thus, in terms of the change in the compressor 3 in the presence of the injection, the enthalpy of the refrigerant compressed from a low pressure to an intermediate pressure (FIG. 2 and FIG. 3, point 11) increases, and the enthalpy of the refrigerant after the injected refrigerant is merged (FIG. 2 and FIG. 3, point 12) also increases. Thus, the discharge enthalpy of the compressor 3 (FIG. 2 and FIG. 3, point 1) also increases, and the discharge temperature of the compressor 3 increases. FIG. 9 shows the change in the correlation between the gas-injection flow rate and the heating capacity, depending on the presence of the heat exchange in the intermediate-pressure receiver 9. In the presence of the heat exchange in the intermediate-pressure receiver 9, the discharge temperature of the compressor 3 is higher than that in the absence of the heat exchange at the same injection level. This higher discharge temperature also increases the temperature of the refrigerant at the inlet of the condenser, the amount of heat exchanged in the condenser, and the heating capacity. Accordingly, the injection flow rate at the peak of the heating capacity increases. This also increases the peak value of the heating capacity, thus improving the heating capacity.

When further increase in the heating capacity is desired, a heat source 17 for heating a refrigerant, such as an electric heater, is provided in the injection circuit 13. The heat source 17 can suppress the decrease in the discharge temperature of the compressor 3 and increase the injection flow rate. The heat source 17 can also increase the peak value of the heating capacity, as shown in FIG. 9.

Furthermore, even in the absence of the heat exchange in the intermediate-pressure receiver 9, the degree of superheat at the inlet of the compressor 3 and the discharge temperature of the compressor 3 can be increased by controlling the degree of opening of the first expansion valve 11. However, in this case, the degree of superheat of the refrigerant at the outlet of the outdoor heat exchanger 12, which serves as an evaporator, is also increased. This decreases the heat exchange efficiency of the outdoor heat exchanger 12. When the heat exchange efficiency of the outdoor heat exchanger 12 decreases, the evaporation temperature must be decreased to achieve the same amount of exchanged heat. Thus, the low pressure is decreased in the operation. The decrease in the low pressure also decreases the flow rate of the refrigerant sucked into the compressor 3. Thus, such an operation contrarily decreases the heating capacity. Conversely, in the presence of the heat exchange in the intermediate-pressure receiver 9, the refrigerant at the outlet of the outdoor heat exchanger 12, which serves as an evaporator, is maintained in an appropriate state. Thus, the discharge temperature of the compressor 3 can be increased with excellent heat exchange efficiency. Thus, the decrease in the low pressure as described above can be avoided, and the heating capacity can be easily increased.

Furthermore, in the circuitry of the Embodiment 1, part of the high-pressure refrigerant is bypassed, is decompressed, is superheated into a gas in the second internal heat exchanger 10, and is injected. Thus, as compared with conventional equipment in which a gas separated with a gas-liquid separator is injected, the distribution of the refrigerant does not fluctuate when the injection level changes in response to the variations in control or operational status. Thus, more stable operation can be achieved.

In terms of the structure for performing the heat exchange in the intermediate-pressure receiver 9, any structure can achieve a similar effect, provided that the heat is exchanged with the refrigerant in the intermediate-pressure receiver 9. For example, the suction pipe of the compressor 3 may be in contact with the outer periphery of the intermediate-pressure receiver 9 for heat exchange.

Furthermore, the refrigerant supplied to the injection circuit 13 may be supplied from the bottom of the intermediate-pressure receiver 9. In this case, in both the cooling operation and the heating operation, a liquid refrigerant flows into the second expansion valve 14. Thus, the flow rate at the second expansion valve 14 is consistent. This ensures the control stability.

As described above, the second expansion valve 14 is controlled such that the discharge temperature of the compressor 3 is equal to the target value. This target value is determined to provide the maximum heating capacity. As shown in FIG. 9, on the basis of the correlation among the gas-injection flow rate, the heating capacity, and the discharge temperature, there is a discharge temperature at which the heating capacity reaches the maximum. Thus, this discharge temperature is previously determined and is employed as the target value. The target value of the discharge temperature is not necessarily a constant value. The target value may be changed as required in a manner that depends on the operating condition or characteristics of an apparatus, such as a condenser. In this way, the gas injection level can be adjusted to achieve the maximum heating capacity by controlling the discharge temperature.

Figure 10:
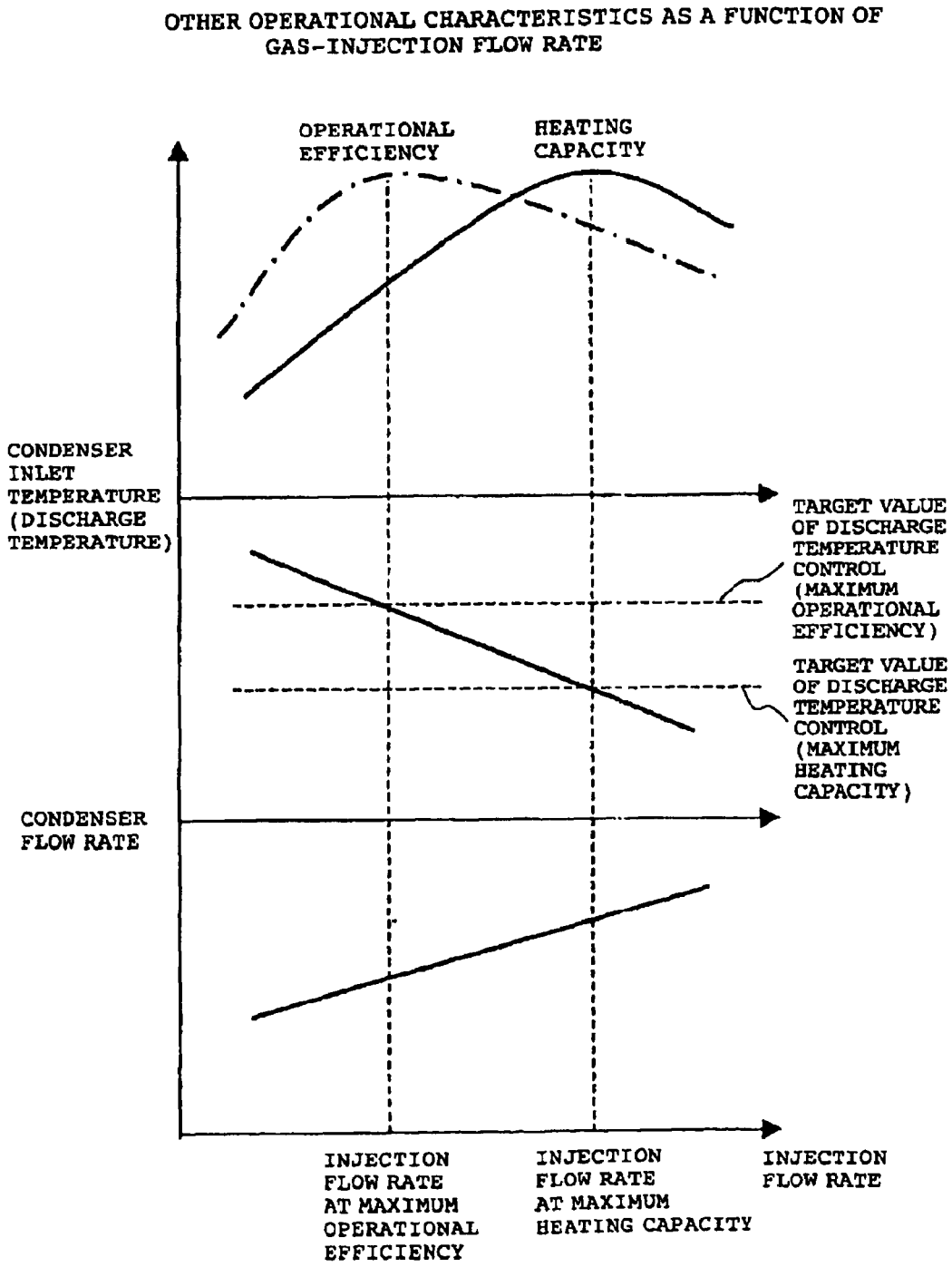
FIG. 10 is another diagram showing the operation characteristics of the refrigeration/air conditioning equipment according to Embodiment 1 of the present invention as a function of the gas-injection flow rate.

The gas injection level can be adjusted not only to achieve the maximum heating capacity, but also to achieve the maximum operational efficiency. When a large heating capacity is required, for example, during the startup of the refrigeration/air conditioning equipment, the gas injection level is adjusted to achieve the maximum heating capacity. When the room temperature has increased after the equipment operates for a certain period of time and large heating capacity is no longer required, the gas injection level is adjusted to achieve the maximum efficiency. FIG. 10 shows the correlation among the injection flow rate, the heating capacity, and the operational efficiency. At the maximum operational efficiency, the injection flow rate is smaller and the discharge temperature is higher than those at the maximum heating capacity. At the injection flow rate at which the heating capacity reaches the maximum, since the discharge temperature is lower, the heat-exchange performance of the condenser decreases. In addition, because the intermediate pressure is decreased to increase the injection flow rate, work of compressing the injected refrigerant increases. Thus, the efficiency is lower than that at the maximum operational efficiency.

Thus, as a target value of the discharge temperature controlled with the second expansion valve 14, not only a target value that provides the maximum heating capacity, but also a target value that provides the maximum operational efficiency are taken into consideration. According to the operational conditions, for example, the operation capacity of the compressor 3 or the air temperature of the indoor unit side, when the heating capacity is required, the target value that provides the maximum heating capacity is specified, and when the heating capacity is not required, the target value that provides the maximum operational efficiency is specified. Such an operation can achieve both large heating capacity and efficient operation.

As described above, the first expansion valve 11 is controlled to adjust the degree of superheat at the inlet of the compressor 3 to the target value. Such control can optimize the degree of superheat at the outlet of the heat exchanger, which serves as an evaporator, ensuring excellent heat-exchange performance of the evaporator. In addition, such control can moderately ensure the difference in the enthalpy of the refrigerant, allowing the operation with high efficiency. While the degree of superheat at the outlet of the evaporator that allows such an operation depends on the characteristics of the heat exchanger, it is about 2° C. Since the refrigerant is further heated by the intermediate-pressure receiver 9, the target value of the degree of superheat at the inlet of the compressor 3 is larger than this value. For example, the target value is 10° C., as described above.

Thus, the first expansion valve 11 may be controlled such that the degree of superheat at the outlet of the evaporator, or in the case of the heating operation the degree of superheat at the outlet of the outdoor heat exchanger 12 obtained from the temperature difference between the second temperature sensor 16b and the third temperature sensor 16c is equal to the target value, for example, 2° C. as described above. However, when the degree of superheat at the outlet of the evaporator is directly controlled and the target value is as low as about 2° C., the refrigerant at the outlet of the evaporator is transiently in a gas-liquid two phase, which prevents appropriate determination of the degree of superheat. This makes the control difficult. When the degree of superheat at the inlet of the compressor 3 is detected, the target value can be increased. Furthermore, the heating in the intermediate-pressure receiver 9 prevents the sucked refrigerant from being in gas-liquid two phase, and thereby prevents inappropriate detection of the degree of superheat. This makes the control easier and stable.

As described above, the third expansion valve 8 is controlled to adjust the degree of supercooling at the outlet of the indoor heat exchanger 6, which serves as a condenser, to the target value. Such control can ensure excellent heat-exchange performance in the condenser and moderately ensure the difference in the enthalpy of the refrigerant, allowing the operation with high efficiency. While the degree of supercooling at the outlet of the condenser that allows such an operation depends on the characteristics of the heat exchanger, it is about 5° C. to 10° C. Furthermore, the target value of the degree of supercooling may be higher than this value. For example, the target value of about 10° C. to 15° C. allows the operation with increased heating capacity. Thus, the target value of the degree of supercooling may be changed in a manner that depends on the operational conditions. During the startup of the equipment, the target value of the degree of supercooling may be slightly higher to ensure high heating capacity. At a steady state at room temperature, the target value of the degree of supercooling may be slightly lower for the efficient operation.

The refrigerant of the refrigeration/air conditioning equipment is not limited to R410A and may be another refrigerant.

Furthermore, the positions of the intermediate-pressure receiver 9 and the second internal heat exchanger 10 are not limited to those in the refrigerant circuitry shown in FIG. 1. Even when the positional relationship between the upstream and the downstream is reversed, a similar effect can be obtained. Furthermore, the position from which the injection circuit 13 is drawn is not limited to that in the refrigerant circuitry shown in FIG. 1. A similar effect can be obtained for any position, provided that the injection circuit 13 can be drawn from another intermediate-pressure portion and a high-pressure liquid portion. In view of the control stability of the second expansion valve 14, the position from which the injection circuit 13 is drawn is desirably the position at which the refrigerant is completely in a liquid phase rather than in a gas-liquid two phase.

In this Embodiment 1, the intermediate-pressure receiver 9, the second internal heat exchanger 10, and the injection circuit 13 are disposed between the first expansion valve 11 and the third expansion valve 8. Thus, in both the cooling operation and the heating operation, a similar injection can be performed.

While the saturation temperatures of the refrigerant are measured with the refrigerant temperature sensors in the middle of the condenser and the evaporator, pressure sensors that can sense high pressure and low pressure may be provided to determine the saturation temperatures from the measured pressures.

Figure 11:
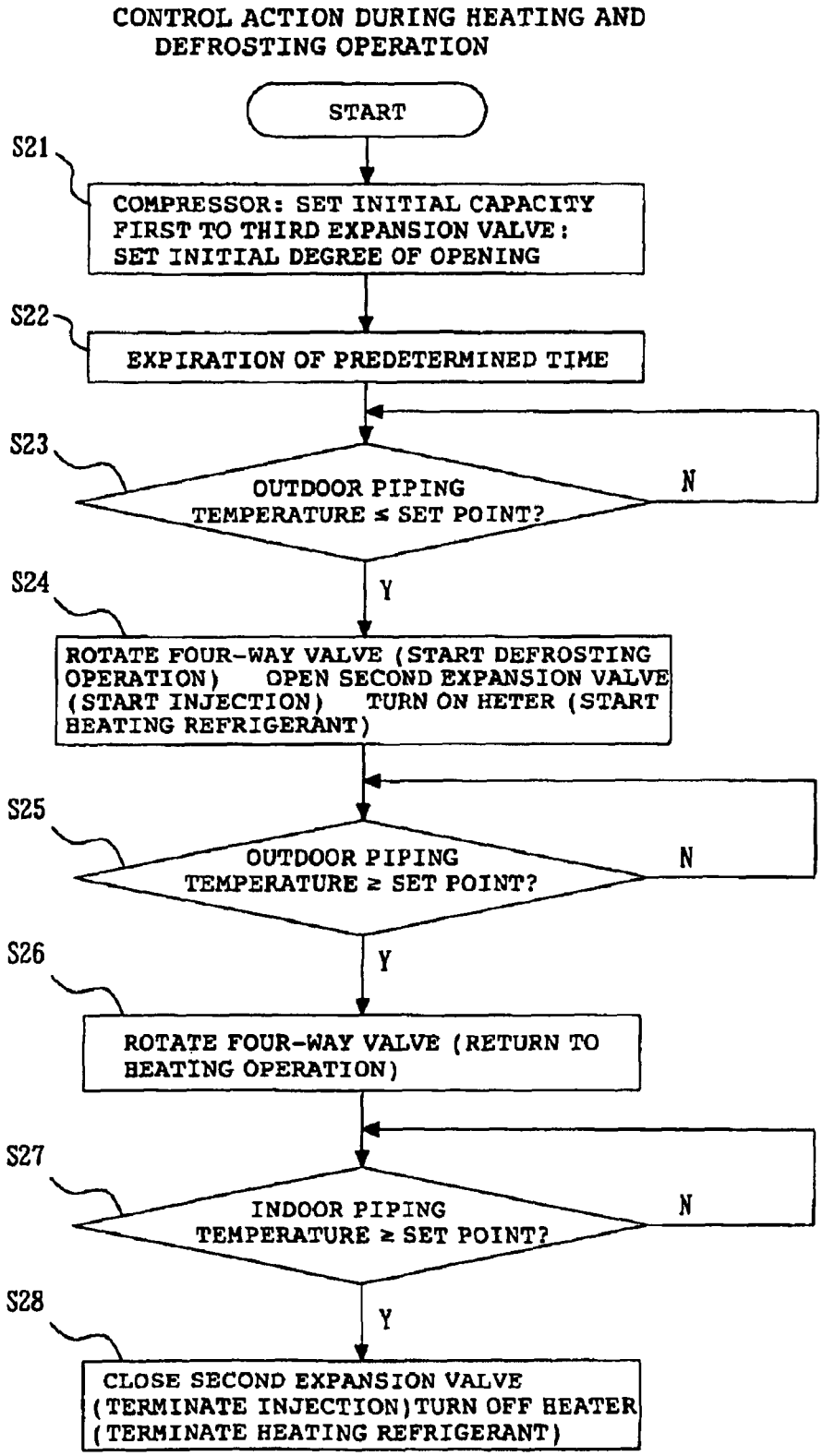
FIG. 11 is a flow chart showing the control action during the heating and defrosting operation of the refrigeration/air conditioning equipment according to Embodiment 1 of the present invention; [and]

FIG. 11 is a flow chart showing the control action during the heating and defrosting operation of the refrigeration/air conditioning equipment. In FIG. 11, the heating operation as described above is performed, and at step S21 the capacity of the compressor 3, the degree of opening of the first expansion valve 11, the degree of opening of the second expansion valve 14, and the degree of opening of the third expansion valve 8 are set to initial values. At step S22, after the expiration of a predetermined time, each actuator is controlled as follows on the basis of its operational status. The capacity of the compressor 3 is basically controlled such that an outdoor piping temperatures measured with the second temperature sensor 16b, the third temperature sensor 16c, and the fourth temperature sensor 16d in the outdoor unit 1 are equal to a temperature set by a user of the refrigeration/air conditioning equipment.

In other words, the outdoor piping temperature of the outdoor unit 1 is compared with the set temperature at step S23. When the outdoor piping temperature is equal to or less than the set temperature (for example, −5° C.), it is concluded that frost forms on the outdoor heat exchanger 12, which serves as an evaporator. Then, the four-way valve is rotated to start a defrosting operation at step S24. To be more specific, the defrosting operation is performed by passing a high-pressure high-temperature refrigerant discharged from the compressor 3 through the outdoor heat exchanger 12, as in the cooling cycle. While the decrease in the discharge temperature is suppressed by opening the second expansion valve 14 and heating the refrigerant with the heat source 17, the circulating volume of the refrigerant flowing into the condenser is increased by the gas injection. This reduces the time of the defrosting operation.

Next, at step S25, the outdoor piping temperature is compared with the set temperature. When the outdoor piping temperature is equal to or more than the set temperature (for example, 8° C.), it is concluded that frost has melted, and the operation proceeds to step S26. The four-way valve 4 is rotated to return to the heating operation and restart the operation. While the decrease in the discharge temperature is suppressed by opening the second expansion valve 14, carrying out the injection, and heating the refrigerant with the heat source 17, as in the defrosting operation, the circulating volume of the refrigerant flowing into the condenser is increased. In addition, increased heating capacity accelerates the startup of the heating operation. Next, at step S27, the indoor piping temperature is compared with a set temperature. When the indoor piping temperature is equal to or less than the set temperature, go to step S28. The second expansion valve 14 is closed to finish the injection. Heating by the heat source 17 is also completed.

Next, operations and effects during the heating and defrosting operation will be described. In the defrosting operation, frost forming on refrigerant pipe of the outdoor heat exchanger 12 during the heating operation is melted by the heat of the refrigerant. This is performed by rotating the four-way valve 4 to flow the refrigerant as in the cooling operation. At the same time, the second expansion valve 14 is opened to inject a gas into the compressor 3. This increases the flow rate of the refrigerant discharged from the compressor 3 and the flow rate of the refrigerant flowing into the outdoor heat exchanger 12, which serves as a condenser. On the other hand, as described above, the discharge temperature of the compressor 3 tends to decrease. Thus, the heat-exchange performance of the condenser is also maximized in this case.

Figure 12:
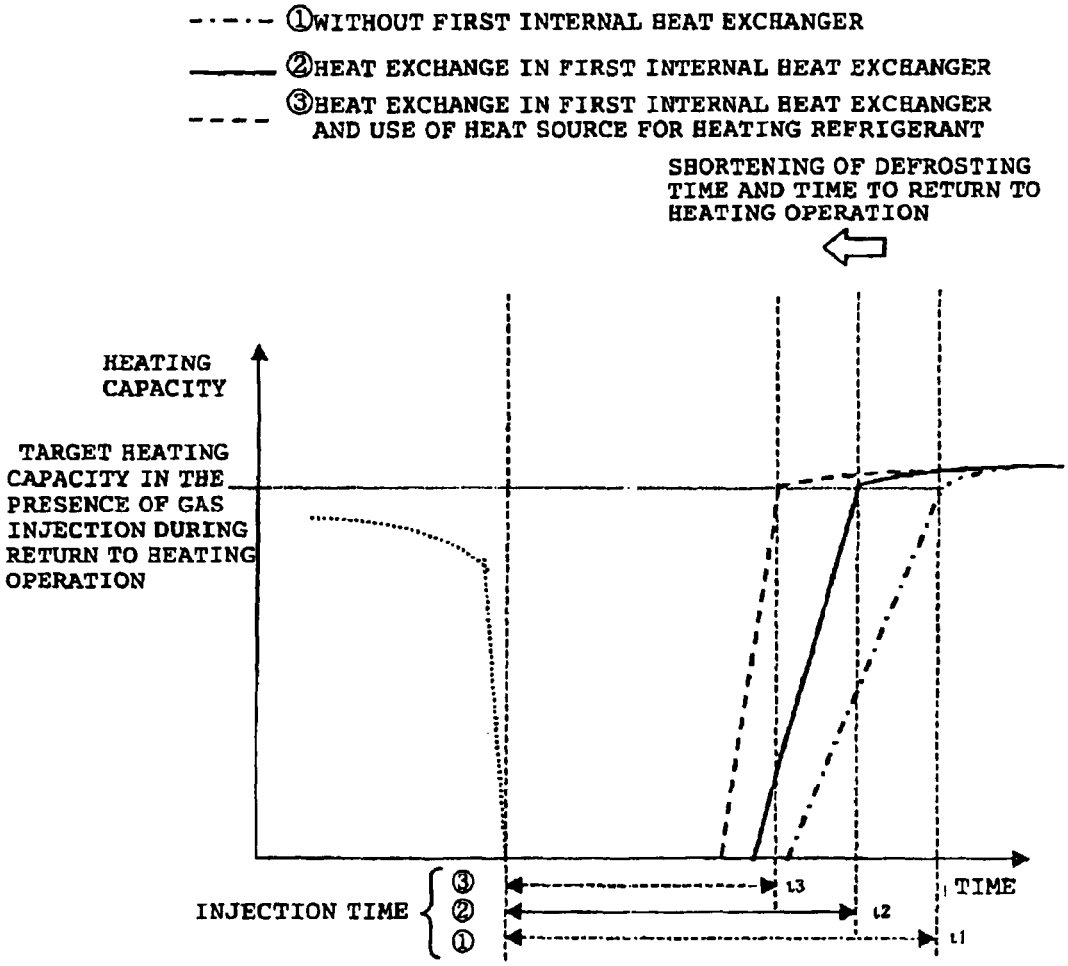
FIG. 12 is a diagram showing the defrosting operation characteristics of the refrigeration/air conditioning equipment according to Embodiment 1 of the present invention with or without a first internal heat exchanger and means for heating a refrigerant*; and*

More specifically, as shown in FIG. 12, there is a gas-injection flow rate at which the defrosting time is minimized. Furthermore, in this embodiment, the heat exchange in the intermediate-pressure receiver 9 provides further improvement, that is, shortening of the defrosting time.

Furthermore, when the heating operation is started after the completion of the defrosting operation, the gas injection can provide high heating capacity, that is, enhance the startup of the heating operation.

The use of the heat source for heating a refrigerant, such as an electric heater, provided in the injection circuit 13, can suppress the decrease in the discharge temperature of the compressor 3 and increase the amount of refrigerant to be injected. This can further shorten the defrosting time. In addition, another use of the heat source for heating a refrigerant during a return to the heating operation can further enhance the startup of the heating operation.

While in the foregoing description the period of the injection during a return to the heating operation is defined as a period until the heating capacity reaches a predetermined value, even when the period of the injection is controlled using the condensation temperature, or is predefined, a similar effect can be achieved.

What is claimed is:

1. Refrigeration/air conditioning equipment comprising:
a compressor;
a four-way valve;
an indoor heat exchanger;
a first decompressor; and
an outdoor heat exchanger,
wherein these components are coupled circularly, and heat is supplied from the indoor heat exchanger,
the refrigeration/air conditioning equipment further comprising:
an intermediate-pressure receiver disposed between the indoor heat exchanger and the first decompressor;
a first internal heat exchanger that exchanges heat between a refrigerant in the intermediate-pressure receiver and a refrigerant in a suction pipe of the compressor; and
an injection circuit in which part of a refrigerant between the indoor heat exchanger and the first decompressor is bypassed and is injected into a compression chamber in the compressor,
the injection circuit comprising:
a second decompressor;
a second internal heat exchanger that exchanges heat between a refrigerant having a pressure reduced by the second decompressor and the refrigerant between the indoor heat exchanger and the first decompressor; and
a heat source for heating a refrigerant, disposed between the second internal heat exchanger and the compressor.

2. The refrigeration/air conditioning equipment according to claim 1, wherein a third decompressor is provided between the indoor heat exchanger and the intermediate-pressure receiver.

3. The refrigeration/air conditioning equipment according to claim 1, further comprising a controller for controlling the degree of superheat of a refrigerant sucked into the compressor or the degree of superheat of a refrigerant at the outlet of the outdoor hear exchanger to a predetermined value by adjusting the first decompressor.

4. The refrigeration/air conditioning equipment according to claim 1, further comprising a controller for controlling the discharge temperature or the degree of superheat of a refrigerant at the outlet of the compressor to a predetermined value by adjusting the second decompressor.

5. The refrigeration/air conditioning equipment according to claim 2, further comprising a controller for controlling the degree of supercooling of a refrigerant at the outlet of the indoor heat exchanger to a predetermined value by adjusting the third decompressor.

6. The refrigeration/air conditioning equipment according to claim 2, further comprising a controller for controlling the degree of superheat of a refrigerant sucked into the compressor or the degree of superheat of a refrigerant at the outlet of the outdoor hear exchanger to a predetermined value by adjusting the first decompressor.

7. The refrigeration/air conditioning equipment according to claim 2, further comprising a controller for controlling the discharge temperature or the degree of superheat of a refrigerant at the outlet of the compressor to a predetermined value by adjusting the second decompressor.

*8. Heating equipment, comprising:*
*a first heat exchanger that makes a refrigerant absorb heat of air;*
*a compressor that sucks the refrigerant from the first heat exchanger;*
*a second heat exchanger that provides a load side medium with heat of the refrigerant discharged from the compressor;*
*a first expansion valve that decompresses the refrigerant flowing from the second heat exchanger to the first heat exchanger, the first heat exchanger, compressor, second heat exchanger and first expansion valve being connected so as to circulate the refrigerant;*
*a third heat exchanger that exchanges heat between the refrigerant flowing from an outlet of the second heat exchanger to an inlet of the first heat exchanger and the refrigerant flowing from the first heat exchanger toward a suction inlet of the compressor;*
*an injection circuit that merges part of the refrigerant flowing from the second heat exchanger to the first heat exchanger with the refrigerant that is sucked by the compressor via the first heat exchanger to be compressed to an intermediate pressure;*
*a second expansion valve that is installed in the injection circuit and decompresses the refrigerant flowing in the injection circuit;*
*a fourth heat exchanger that is installed in the injection circuit to supply heat of the refrigerant flowing from the second heat exchanger toward the first heat exchanger to the refrigerant flowing toward an injection inlet of the compressor in the injection circuit; and*
*a controller that controls an opening degree of the first and the second expansion valves.*

*9. The heating equipment of claim 8, wherein*
*the controller controls the second expansion valve so that the refrigerant flowing in the injection circuit becomes a gas-liquid two phase state.*

*10. The heating equipment of claim 8, wherein*
*the injection circuit branches from between the second heat exchanger and the first expansion valve.*

*11. The heating equipment of claim 10, wherein*
*the injection circuit branches from between the third heat exchanger and the fourth heat exchanger.*

*12. The heating equipment of claim 8 comprising:*
*a third expansion valve provided between the second heat exchanger and the third heat exchanger to be controlled by the controller.*

*13. The heating equipment of claim 12, wherein*
*the third heat exchanger has a receiver provided with a function to store part of the refrigerant flowing from the second heat exchanger to the first heat exchanger, and exchanges heat between the refrigerant stored within the receiver and the refrigerant flowing from the first heat exchanger to the compressor.*

*14. The heating equipment of claim 13, wherein*
*the third expansion valve decompresses the refrigerant flowing from the second heat exchanger to the receiver.*

*15. The heating equipment of claim 8, wherein*
*the second heat exchanger is a condenser.*

*16. The heating equipment of claim 8, wherein*
*the load side medium that exchanges heat with the refrigerant discharged from the compressor in the second heat exchanger is air.*

*17. The heating equipment of claim 8, wherein*
*the load side medium that exchanges heat with the refrigerant discharged from the compressor in the second heat exchanger is water.*

*18. The heating equipment of claim 8 comprising a*
*temperature sensor that detects a discharge temperature of the refrigerant discharged from the compressor, wherein*

*the controller controls an opening degree of the second expansion valve to be large so as to decrease enthalpy of the refrigerant when the discharge temperature detected by the temperature sensor is higher than a target value, and controls the opening degree of the second expansion valve to be small so as to increase enthalpy of the refrigerant when the discharge temperature is lower than the target value.*

*19. An outdoor unit of heating equipment including a first heat exchanger that makes a refrigerant absorb heat of air, a compressor that sucks the refrigerant from the first heat exchanger and discharges the refrigerant to a second heat exchanger that is externally installed, and a first expansion valve that decompresses the refrigerant flowing toward the first heat exchanger after providing a load side medium with heat in the second heat exchanger, comprising*

*a third heat exchanger that exchanges heat between the refrigerant flowing from an outlet of the second heat exchanger toward an inlet of the first heat exchanger and the refrigerant flowing from the first heat exchanger toward a suction inlet the compressor;*

*an injection circuit that merges part of the refrigerant flowing from the second heat exchanger toward the first heat exchanger with the refrigerant that is sucked by the compressor via the first heat exchanger to be compressed to an intermediate pressure;*

*a second expansion valve that is installed in the injection circuit and decompresses the refrigerant flowing in the injection circuit;*

*a fourth heat exchanger that is installed in the injection circuit to supply heat of the refrigerant flowing from the second heat exchanger toward the first heat exchanger to the refrigerant flowing toward an injection inlet of the compressor in the injection circuit; and*

*a controller that controls an opening degree of the first and the second expansion valves.*

*20. The outdoor unit of heating equipment of claim 19, wherein*

*the controller controls the second expansion valve so that the refrigerant flowing in the injection circuit becomes a gas-liquid two phase state.*

*21. The outdoor unit of heating equipment of claim 19, wherein*

*the injection circuit branches from between the second heat exchanger and the first expansion valve.*

*22. The outdoor unit of heating equipment of claim 21, wherein*

*the injection circuit branches from between the third heat exchanger and the fourth heat exchanger.*

*23. The outdoor unit of heating equipment of claim 19 comprising:*

*a third expansion valve provided between the second heat exchanger and the third heat exchanger to be controlled by the controller.*

*24. The outdoor unit of heating equipment of claim 23, wherein*

*the third heat exchanger has a receiver having a function to store part of a refrigerant flowing from the second heat exchanger to the first heat exchanger, and exchanges heat between the refrigerant stored in the receiver and the refrigerant flowing from the first heat exchanger to the compressor.*

*25. The outdoor unit of heating equipment of claim 24, wherein*

*the third expansion valve decompresses the refrigerant flowing from the second heat exchanger to the receiver.*

*26. The outdoor unit of heating equipment of claim 19, wherein*

*the second heat exchanger is a condenser.*

*27. The outdoor unit of heating equipment of claim 19, wherein*

*the load side medium that exchanges heat with the refrigerant discharged from the compressor in the second heat exchanger is air.*

*28. The outdoor unit of heating equipment of claim 19, wherein*

*the load side medium that exchanges heat with the refrigerant discharged from the compressor in the second heat exchanger is water.*

*29. The outdoor unit of heating equipment of claim 19 including a temperature sensor that detects a discharge temperature of the refrigerant discharged from the compressor, wherein*

*the controller controls an opening degree of the second expansion valve to be large so as to decrease enthalpy of the refrigerant when the discharge temperature detected by the temperature sensor is higher than a target value and controls the opening degree of the second expansion valve to be small so as to increase enthalpy of the refrigerant when the discharge temperature is lower than the target value.*

* * * * *